United States Patent
Ono et al.

(10) Patent No.: US 12,217,482 B2
(45) Date of Patent: Feb. 4, 2025

(54) PROCESSING APPARATUS, PROCESSING METHOD, AND COMPUTER READABLE MEDIUM

(71) Applicant: NEC Corporation, Tokyo (JP)

(72) Inventors: Yoshimasa Ono, Tokyo (JP); Akira Tsuji, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 17/637,132

(22) PCT Filed: Aug. 28, 2019

(86) PCT No.: PCT/JP2019/033770
§ 371 (c)(1),
(2) Date: Feb. 22, 2022

(87) PCT Pub. No.: WO2021/038767
PCT Pub. Date: Mar. 4, 2021

(65) Prior Publication Data
US 2022/0343628 A1 Oct. 27, 2022

(51) Int. Cl.
*G06V 10/762* (2022.01)
*G06V 10/764* (2022.01)

(52) U.S. Cl.
CPC .......... *G06V 10/764* (2022.01); *G06V 10/762* (2022.01)

(58) Field of Classification Search
CPC .................................................. G06V 10/764
See application file for complete search history.

(56) References Cited

U.S. PATENT DOCUMENTS

| | | | |
|---|---|---|---|
| 10,593,042 B1* | 3/2020 | Douillard | G06V 20/64 |
| 2014/0368807 A1* | 12/2014 | Rogan | G01S 17/89 |
| | | | 356/28 |
| 2015/0063539 A1 | 3/2015 | Hayler et al. | |
| 2016/0217344 A1 | 7/2016 | Misra et al. | |
| 2018/0059060 A1 | 3/2018 | Dusseault et al. | |
| 2019/0311546 A1* | 10/2019 | Tay | G06T 7/521 |

(Continued)

FOREIGN PATENT DOCUMENTS

| | | |
|---|---|---|
| JP | 2010-151577 A | 7/2010 |
| JP | 2017-009546 A | 1/2017 |

(Continued)

OTHER PUBLICATIONS

International Search Report for PCT Application No. PCT/JP2019/033770, mailed on Nov. 19, 2019.

(Continued)

*Primary Examiner* — Oneal R Mistry
(74) *Attorney, Agent, or Firm* — Sughrue Mion, PLLC

(57) ABSTRACT

A processing apparatus (10) includes classification means (12) for classifying three-dimensional point group data acquired based on a reflected light from a structure to be inspected illuminated by light into clusters, which are units of a shape that corresponds to the structure to be inspected, based on positional information at each point of the data; and cluster association means (13) for determining whether a first cluster and a second cluster included in the classified clusters correspond to one structure to be inspected based on a positional relation between the classified clusters.

17 Claims, 19 Drawing Sheets

(56) References Cited

U.S. PATENT DOCUMENTS

| 2020/0165107 | A1 | 5/2020 | Kosaka et al. |
| 2020/0256999 | A1* | 8/2020 | Yellepeddi .............. G01S 17/89 |
| 2022/0326182 | A1 | 10/2022 | Maruyama et al. |

FOREIGN PATENT DOCUMENTS

| JP | 2018-180571 A1 | 11/2018 |
| JP | 2019-024151 A | 2/2019 |
| JP | 2019-096119 A | 6/2019 |

OTHER PUBLICATIONS

International Search Report for PCT/JP2019/036988, mailed on Nov. 19, 2019.

U.S. Office Action for U.S. Appl. No. 17/641,175, mailed on Jul. 19, 2024.

U.S. Office Action for U.S. Appl. No. 17/641,175, mailed on Dec. 6, 2024.

Min Zhang, Minzhou Luo, Xiaobin Xu, Zhiying Tan, Hao Yang, Zhihao Li, "Planar Feature Extraction and Fitting Method Based on Density Clustering Algorithm", 2018 5th IEEE International Conference on Cloud Computing and Intelligence Systems (CCIS), PP. 583-587, Nov. 1, 2018 (Year: 2018).

Reza Maalek, Derek D Lichti, Janaka Y Ruwanpura, "Robust Segmentation of Planar and Linear Features of Terrestrial Laser Scanner Point Clouds Acquired from Construction Sites", Sensors (Basel, Switzerland), 18(3), 819, pp. 1-30, Mar. 8, 2018 (Year: 2018).

Wenting Zhang, Wenjie Qiu, Di Song, Bin Xie, "Automatic Tunnel Steel Arches Extraction Algorithm Based on 3D Lidar Point Cloud", Sensors (Basel, Switzerland), 19(18), 3972, pp. 1-24, Sep. 14, 2019 (Year: 2019).

* cited by examiner

PROCESSING APPARATUS, PROCESSING METHOD, AND COMPUTER READABLE MEDIUM

This application is a National Stage Entry of PCT/JP2019/033770 filed on Aug. 28, 2019, the contents of all of which are incorporated herein by reference, in their entirety.

TECHNICAL FIELD

The present disclosure relates to a processing apparatus, a processing method, and a computer readable medium.

BACKGROUND ART

With regard to inspection of structures to be inspected such as factory equipment, development of techniques for detecting the shape of a structure to be inspected has been advancing. For example, Patent Literature 1 discloses a technique for acquiring point group data of a structure to be inspected using a three-dimensional laser scanner and detecting the shape of the structure to be inspected based on the point group data that has been acquired.

CITATION LIST

Patent Literature

[Patent Literature 1] Japanese Unexamined Patent Application Publication No. 2010-151577

SUMMARY OF INVENTION

Technical Problem

Incidentally, in order to detect the shape of the structure to be inspected, clustering processing needs to be performed on point group data of the structure to be inspected that has been acquired based on positional information of the point group. The clustering processing is processing for classifying a point group considered to be one structure as a cluster. However, when the shape of the structure to be inspected is complicated, such as equipment with complicated piping, one structure may be classified into a plurality of different clusters or different structures may be classified into one cluster in the clustering processing. When the accuracy of the clustering processing is not high, it is possible that abnormalities in the structure to be inspected may not be detected accurately.

The present invention has been made in view of the above background, and aims to provide a processing apparatus capable of processing point group data acquired from the structure to be inspected so that it becomes possible to accurately detect abnormalities of the structure to be inspected.

Solution to Problem

A processing apparatus according to a first aspect of the present invention includes: classification means for classifying three-dimensional point group data acquired based on a reflected light from a structure to be inspected illuminated by light into clusters, which are units of a shape that corresponds to the structure, based on positional information at each point of the data; and cluster association means for determining whether a first cluster and a second cluster included in the classified clusters correspond to one structure based on a positional relation between the classified clusters.

A processing method according to a second aspect of the present invention includes the steps of: classifying three-dimensional point group data acquired based on a reflected light from a structure to be inspected illuminated by light into clusters, which are units of a shape that corresponds to the structure, based on positional information at each point of the data; and determining whether a first cluster and a second cluster included in the classified clusters correspond to one structure based on a positional relation between the classified clusters.

A non-transitory computer readable medium according to a third aspect of the present invention stores a program for causing a computer to execute the following steps of: classifying three-dimensional point group data acquired based on a reflected light from a structure to be inspected illuminated by light into clusters, which are units of a shape that corresponds to the structure, based on positional information at each point of the data; and determining whether a first cluster and a second cluster included in the classified clusters correspond to one structure based on a positional relation between the classified clusters.

Advantageous Effects of Invention

According to the present invention, it is possible to process point group data acquired from a structure to be inspected so that it becomes possible to accurately detect abnormalities of the structure to be inspected.

DESCRIPTION OF EMBODIMENTS

Figure 1:
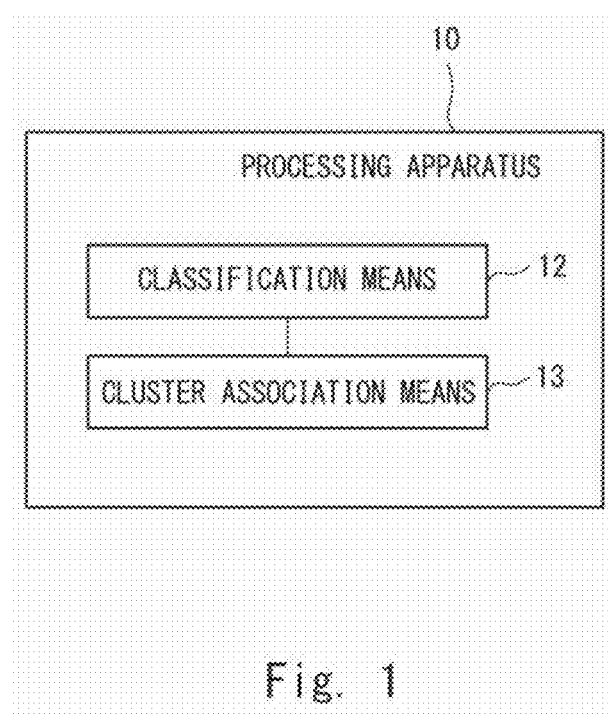
FIG. 1 is a block diagram showing a configuration of a processing apparatus according to a first example embodiment.

Hereinafter, with reference to the drawings, example embodiments of the present invention will be described. For the sake of clarification of the description, the following description and the drawings are omitted and simplified as appropriate. Throughout the drawings, the same components are denoted by the same reference symbols and overlapping descriptions are omitted as required. Note that the right-handed XYZ-coordinate system shown in the drawings is used for the sake of convenience to illustrate a positional relation among components.

First Example Embodiment

Hereinafter, a first example embodiment will be described.

FIG. 1 is a block diagram showing a configuration of a processing apparatus 10 according to the first example embodiment. As shown in FIG. 1, the processing apparatus 10 includes classification means 12 and cluster association means 13.

The classification means 12 classifies three-dimensional point group data acquired based on a reflected light from a structure to be inspected illuminated by light into clusters, which are units of a shape that corresponds to the structure, based on positional information at respective points of the three-dimensional point group data.

The cluster association means 13 determines whether a first cluster and a second cluster included in the classified clusters correspond to one structure to be inspected based on a positional relation between the classified clusters.

According to the processing apparatus 10 configured as stated above, it is possible to process the point group data acquired from the structure to be inspected so that it becomes possible to accurately detect abnormalities of the structure to be inspected.

Second Example Embodiment

Hereinafter, a second example embodiment will be described.

Figure 2:
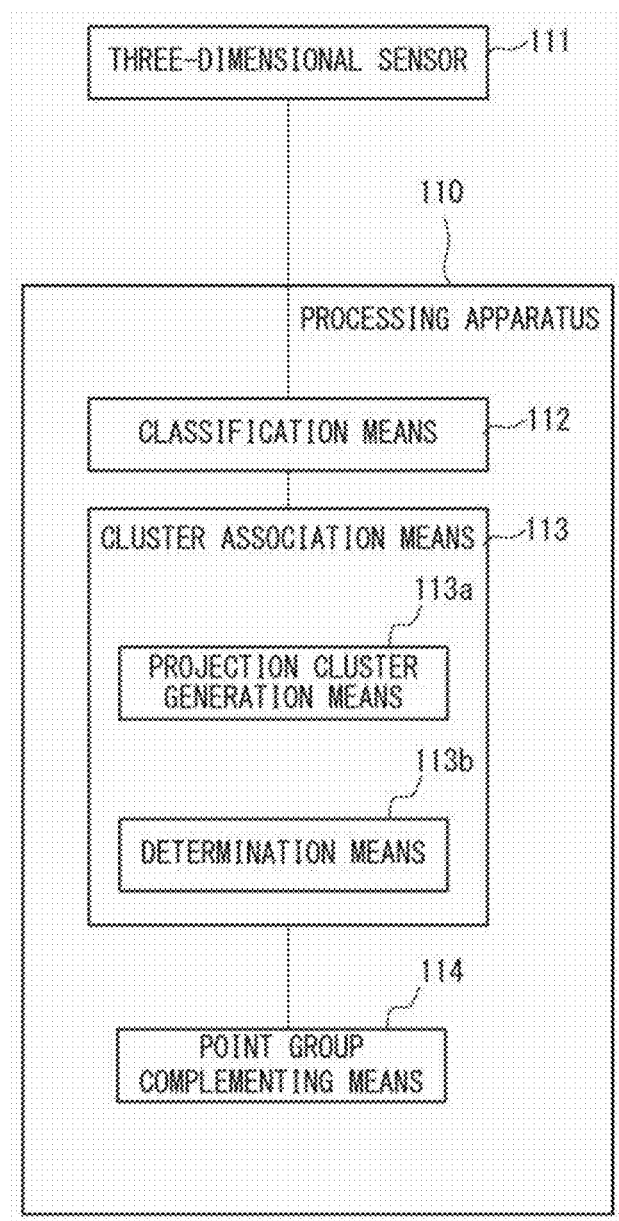
FIG. 2 is a block diagram showing a configuration of a processing apparatus according to a second example embodiment.

First, a configuration example of a processing apparatus according to the second example embodiment will be described. FIG. 2 is a block diagram showing a configuration of a processing apparatus 110 according to the second example embodiment. As shown in FIG. 2, the processing apparatus 110 includes classification means 112, cluster association means 113, and point group complementing means 114.

The classification means 112 classifies point group data (three-dimensional point group data) acquired based on a reflected light from a structure to be inspected illuminated by light by a three-dimensional sensor 111 into clusters, which are units of a shape that corresponds to this structure, based on positional information of the point group data at respective points.

The three-dimensional sensor 111, which is configured to be able to measure a distance at least based on amplitude information of light, irradiates light on the structure to be inspected to acquire point group data. The three-dimensional sensor 111 is, for example, a 3D-Light Detection and Ranging (LiDAR) sensor.

The cluster association means 113 includes projection cluster generation means 113a and determination means 113b. The projection cluster generation means 113a generates a first projection cluster obtained by projecting the first cluster onto a predetermined first plane and a second projection cluster obtained by projecting the second cluster onto the first plane. The first and second clusters are freely-selected two clusters included in clusters classified by the classification means 112. The predetermined first plane will be explained later.

The determination means 113b determines whether to associate the first cluster with the second cluster as one structure based on a positional relation between clusters. The determination means 113b takes into account the result of the determination regarding whether the first projection cluster matches the second projection cluster in the association between the first cluster and the second cluster.

The point group complementing means 114 complements a point group between the first cluster and the second cluster when it has been determined in the cluster association means 113 that the first and second clusters should be associated with each other.

Next, a flow of processing the point group data acquired from the structure to be inspected in the processing apparatus 110 shown in FIG. 2 will be described. In the following description, FIG. 2 will be referred to as well.

Figure 3:
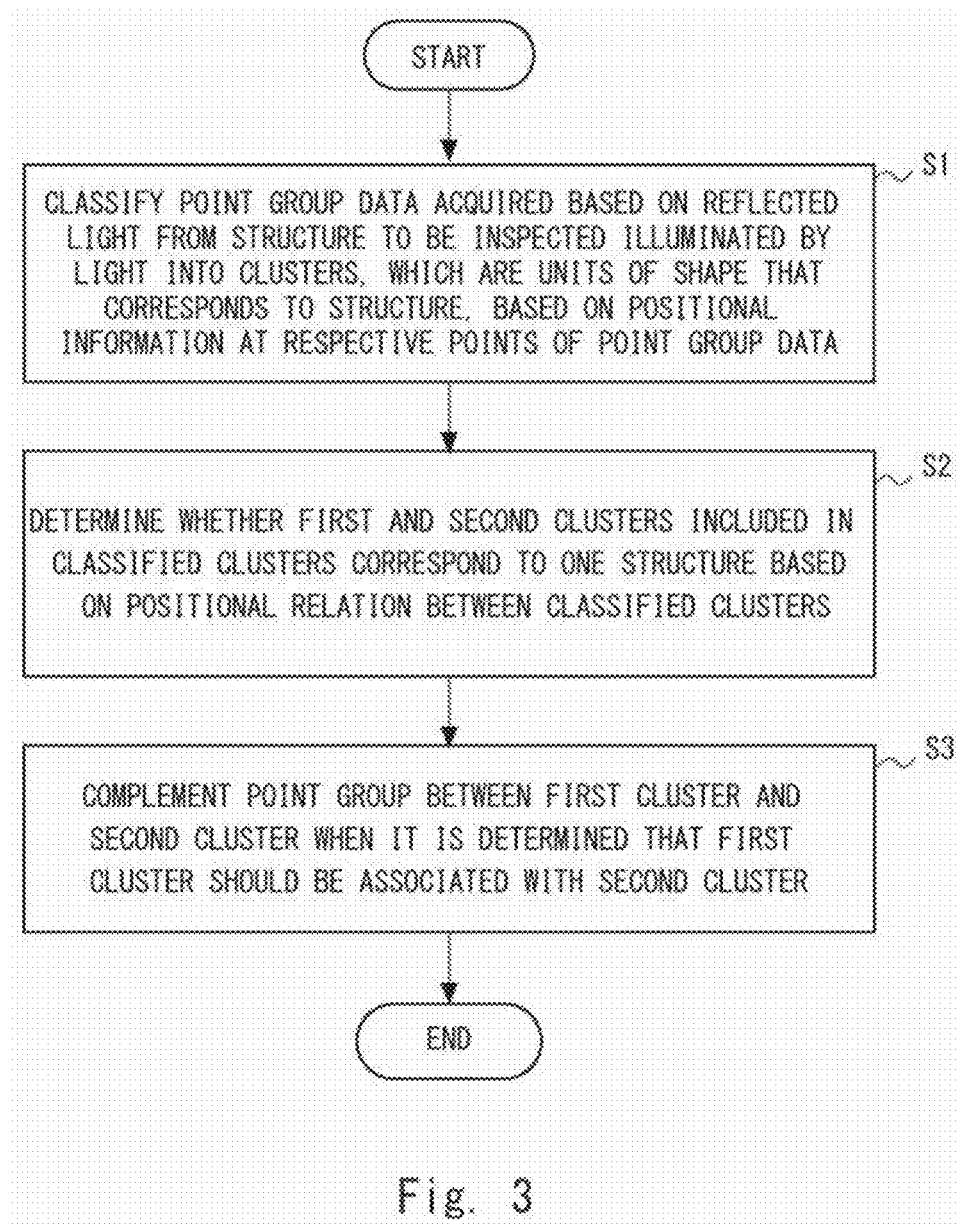
FIG. 3 is a flowchart for describing a flow of processing point group data acquired from a structure to be inspected in the processing apparatus according to the second example embodiment.

FIG. 3 is a flowchart for describing a flow of processing the point group data acquired from the structure to be inspected in the processing apparatus 110. As shown in FIG. 3, first, the classification means 112 classifies the point group data acquired based on the reflected light from the structure to be inspected illuminated by light into clusters, which are units of the shape that corresponds to this structure, based on positional information at the respective points of the point group data (Step S1). Next, the cluster association means 113 determines whether the first and second clusters included in the classified clusters correspond to one structure based on the positional relation between the classified clusters (Step S2). Next, the point group complementing means 114 complements a point group between the first cluster and the second cluster when it is determined in the cluster association means 113 that the first cluster should be associated with the second cluster (Step S3).

Next, a method of determining whether the first and second clusters correspond to one structure in Step S2 in FIG. 3 will be described in detail.

Figure 4:
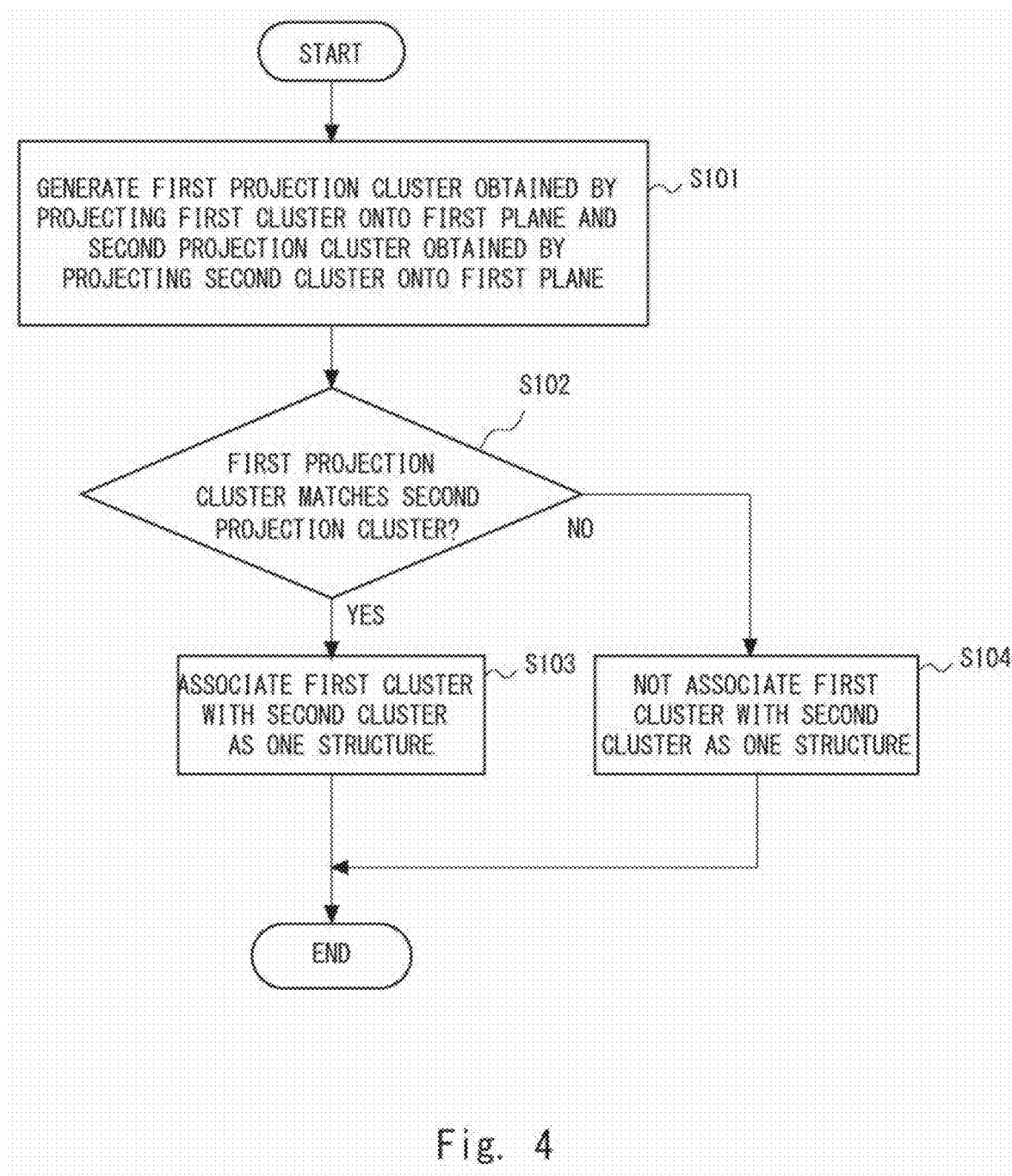
FIG. 4 is a flowchart showing a flow of processing of a subroutine in Step S2 in FIG. 3.

FIG. 4 is a flowchart showing a flow of processing of a subroutine in Step S2 in FIG. 3. As shown in FIG. 4, first, the projection cluster generation means 113a generates a first projection cluster obtained by projecting the first cluster onto the predetermined first plane and a second projection cluster obtained by projecting the second cluster onto the first plane (Step S101). Next, the determination means 113b determines whether the first projection cluster matches the second projection cluster (Step S102). When the first projection cluster matches the second projection cluster in Step S102, the first and second clusters are associated with each other as one structure in the determination means 113b (Step S103). When the first projection cluster does not match the second projection cluster in Step S102, the first and second clusters are not associated with each other as one structure in the determination means 113b (Step S104).

Figure 5:
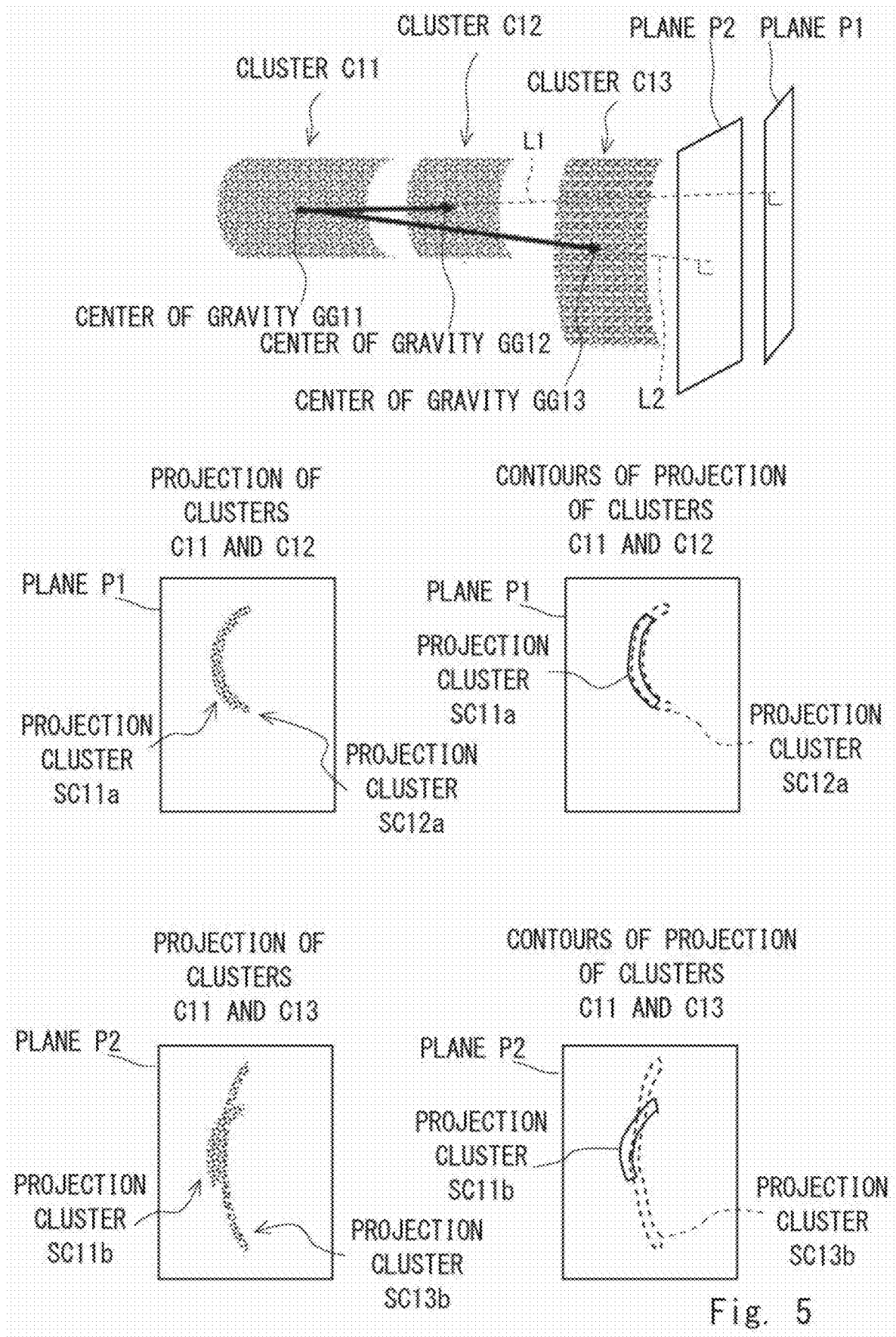
FIG. 5 is a schematic view for describing one example of a method of generating a first projection cluster and a second projection cluster in Step S101 in FIG. 4.

FIG. 5 is a schematic view for describing one example of a method of generating the first projection cluster and the second projection cluster in Step S101 in FIG. 4. In the example described here, the first plane is a plane vertical to the line that connects the center of gravity of the first cluster to the center of gravity of the second cluster.

First, a case in which a cluster C11 is the first cluster and a cluster C12 is the second cluster will be described. As shown in the upper stage of FIG. 5, the first plane is a plane P1 vertical to a line L1 that connects the center of gravity GG11 of the cluster C11 to the center of gravity GG12 of the cluster C12. As shown in the middle stage of FIG. 5, by projecting the cluster C11 onto the plane P1, a projection cluster SC11a that corresponds to the first cluster is generated. Likewise, as shown in the middle stage of FIG. 5, by projecting the cluster C12 onto the plane P1, a projection cluster SC12a that corresponds to the second cluster is generated. In the middle stage of FIG. 5, the left side shows the projection of the clusters C11 and C12 onto the plane P1 and the right side shows contours of the projection of the clusters C11 and C12 onto the plane P1.

As shown in the middle stage of FIG. 5, the degree of match between the projection cluster SC11a and the projection cluster SC12a is high. In this case, it is determined in Step S102 in FIG. 4 that the projection cluster SC11a and the projection cluster SC12a match each other. Therefore, the clusters C11 and C12 are associated with each other as one structure (processing of Step S103 in FIG. 4).

Next, a case in which the cluster C11 is the first cluster and a cluster C13 is the second cluster will be described. As shown in the upper stage of FIG. 5, the first plane is a plane P2 vertical to a line L2 that connects the center of gravity GG11 of the cluster C11 to the center of gravity GG13 of the cluster C13. As shown in the lower stage of FIG. 5, by projecting the cluster C11 onto the plane P2, a projection cluster SC11b that corresponds to the first cluster is generated. Likewise, as shown in the lower stage of FIG. 5, by projecting the cluster C12 onto the plane P2, a projection cluster SC13b that corresponds to the second cluster is generated. In the lower stage of FIG. 5, the left side shows the projection of the clusters C11 and C13 onto the plane P2 and the right side shows contours of the projection of the clusters C11 and C13 onto the plane P2.

As shown in the lower stage of FIG. 5, the degree of match of the projection cluster SC11b and the projection cluster SC13b is low. Therefore, it is determined in Step S102 in FIG. 4 that the projection cluster SC11b and the projection cluster SC13b match each other. Accordingly, the clusters C11 and C13 are not associated with each other as one structure (processing of Step S104 in FIG. 4).

Note that the determination regarding whether the first projection cluster matches the second projection cluster (determination regarding whether the degree of match is high or low) in Step S102 in FIG. 4 can be performed, for example, by the following method. First, for each of the points included in the first projection cluster, the distance between the point included in the first projection cluster and a point that is included in the second projection cluster and is located closest to the above point is calculated. Then, the average of the calculated distances (average distance) is obtained. When this average distance is equal to or smaller than a predetermined value, it is determined that the first and second clusters match each other.

Next, a case in which the first and second clusters are not associated with each other even when it is determined in Step S102 in FIG. 4 that the first projection cluster and the second projection cluster match each other will be described.

Figure 6:
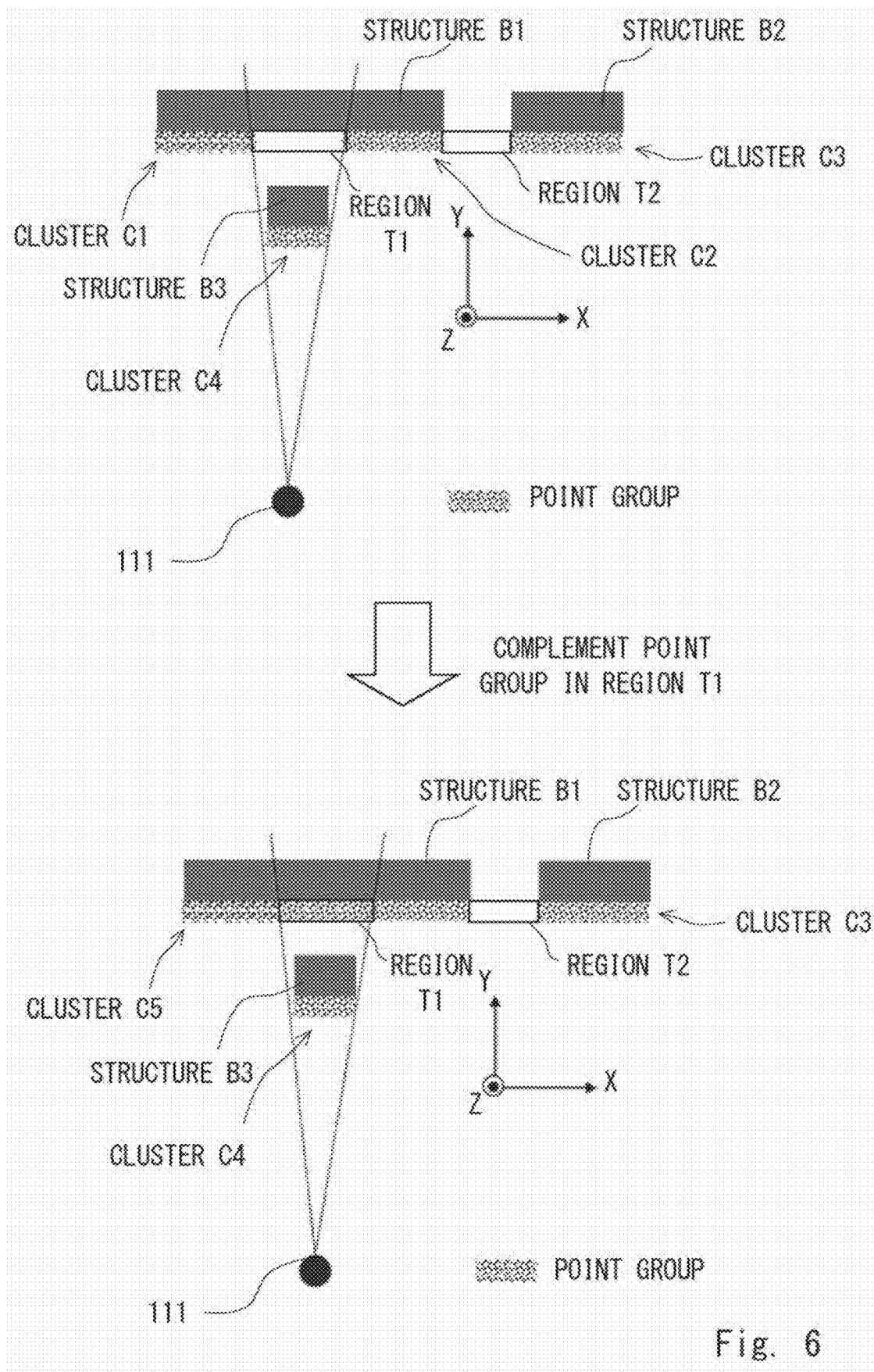
FIG. 6 is a schematic view for describing a case in which first and second clusters are not associated with each other even when it is determined in Step S102 in FIG. 4 that the first and second clusters match each other.

FIG. 6 is a schematic view for describing a case in which the first and second clusters are not associated with each other even when it is determined in Step S102 in FIG. 4 that the first and second clusters match each other. Assume that the projection cluster of the cluster C1 matches the projection cluster of the cluster C2. It is further assumed that the projection cluster of the cluster C2 matches the projection cluster of a cluster C3.

As shown in FIG. 6, the clusters C1 and C2 are both point groups acquired from a structure B1, the cluster C3 is a point group acquired from a structure B2, and a cluster C4 is a point group acquired from a structure B3. Since the clusters C1 and C2 are the same structure, they need to be associated with each other as one structure. On the other hand, since the clusters C2 and C3 are structures different from each other, they are not associated with each other as one structure.

The structure B3 is present in a position in front of the structure B1 with respect to the three-dimensional sensor 111. Therefore, light from the three-dimensional sensor 111 is shielded by the structure B3 and thus does not reach a region T1 of the structure B1. Therefore, a point group is not acquired from the region T1 of the structure B1. Since the structure B3 is present in front of the region T1 with respect to the three-dimensional sensor 111, a point group is acquired from this position.

On the other hand, the structures B1 and B2 are different from each other. Therefore, a point group is not acquired from a region T2 which is between the structure B1 and the structure B2. Since there is no structure in a position in front of the region T2 with respect to the three-dimensional sensor 111, a point group is not acquired from this position as well.

It is possible that projection clusters generated from two clusters acquired from structures different from each other may match each other by chance, like the clusters C2 and C3. In order to address this problem, the cluster association means 113 determines whether there is a third cluster including points whose number is equal to or larger than a predetermined number in a position in front of a region between the first cluster and the second cluster with respect to the three-dimensional sensor. When there is a third cluster, the first and second clusters are associated with each other. On the other hand, when there is no third cluster, the first and second clusters are not associated with each other.

That is, in a position in front of a region between the cluster C1 and the cluster C2 with respect to the three-dimensional sensor 111, the cluster C4 including points whose number is equal to or larger than a predetermined number is present. In this case, the clusters C1 and C2 are associated with each other. On the other hand, in a position in front a region between the cluster C2 and the cluster C3 with respect to the three-dimensional sensor 111, there is no cluster including points whose number is equal to or larger than a predetermined number. In this case, the clusters C2 and C3 are not associated with each other. Then, a point group is complemented by the point group complementing means 114 (see FIG. 2) in the region T1 which is between the cluster C1 and the cluster C2 associated with each other. Accordingly, a cluster C5 that corresponds to the structure B1 is obtained.

Next, a method of complementing a point group between the first cluster and the second cluster in Step S3 in FIG. 3 will be described.

Figure 7:
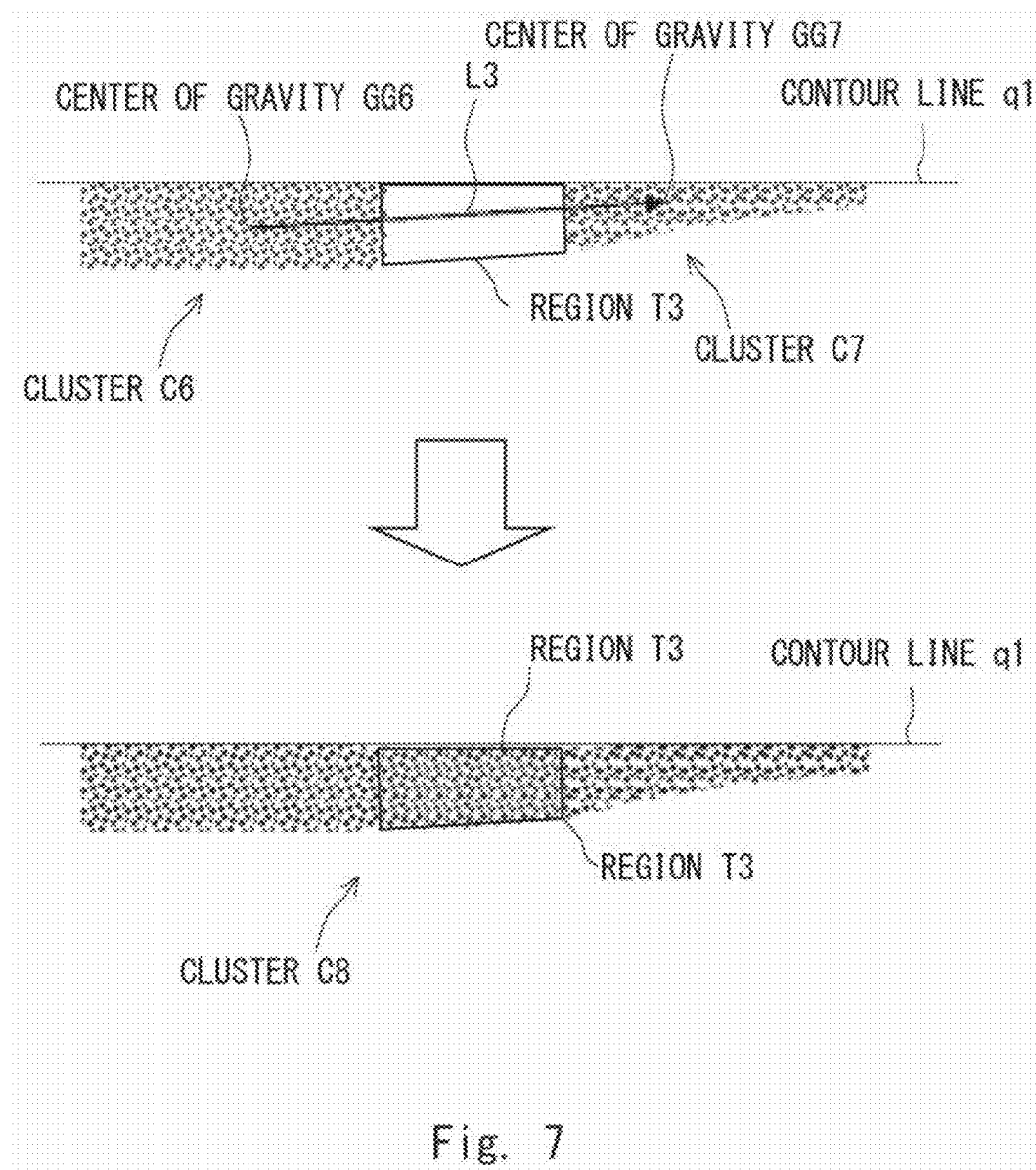
FIG. 7 is a schematic view for describing a method of complementing a point group between the first cluster and the second cluster.
Figure 8:
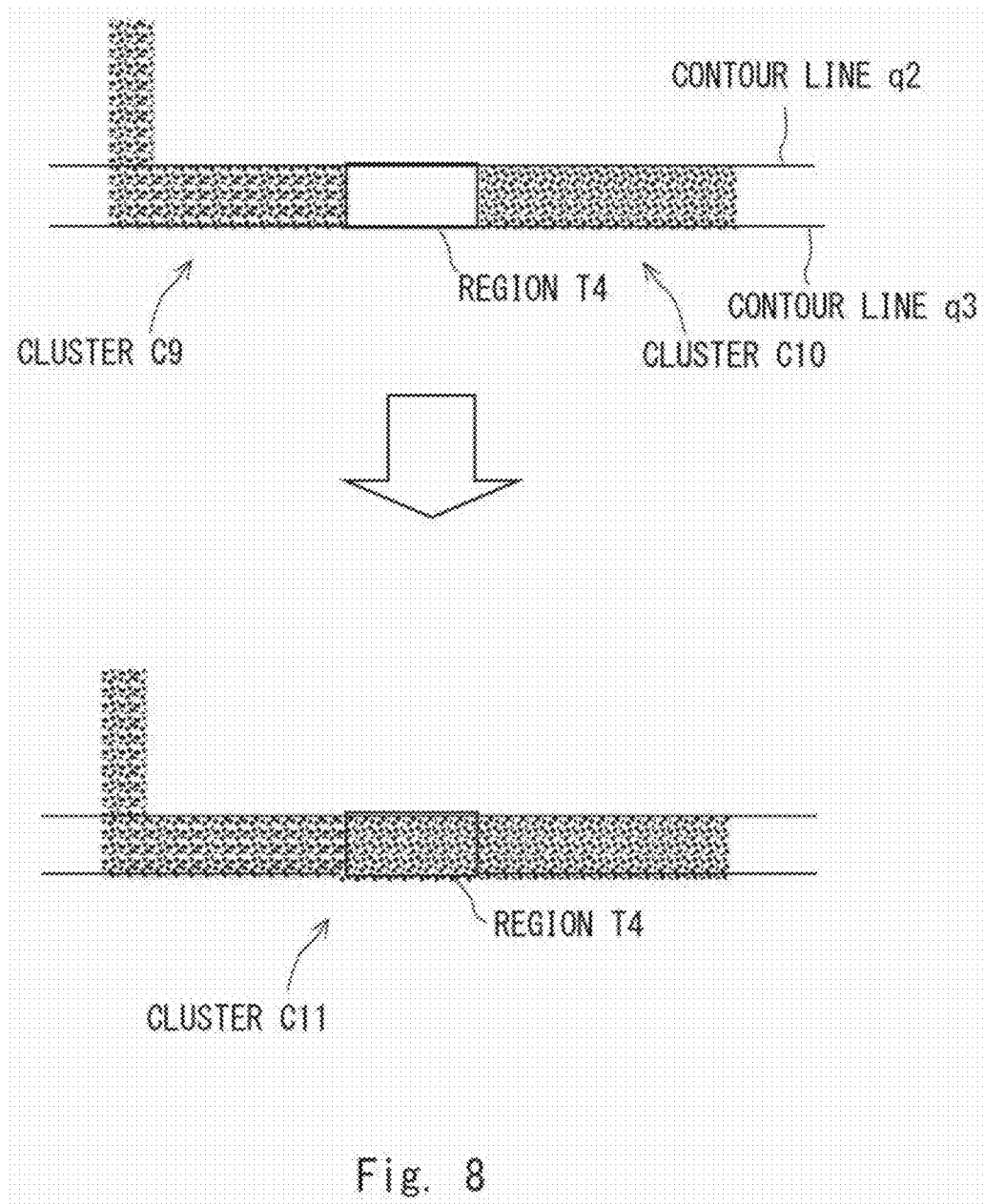
FIG. 8 is a schematic view for describing a method of complementing a point group between the first cluster and the second cluster.

FIGS. 7 and 8 are schematic views for describing a method of complementing a point group between the first cluster and the second cluster. Assume that one contour line in contours of the cluster C6 matches one contour line in contours of the cluster C7 shown in FIG. 7 (a contour line q1 in the cluster C6 matches that of the cluster C7). It is further assumed that two contour lines in contours of the cluster C9 matches two contour lines in contours of the cluster C10 shown in FIG. 8 (contour lines q2 and q3 in the cluster C9 match those of the cluster C10).

When one contour line in contours of one cluster matches that of another cluster as shown in FIG. 7, a point group is interpolated along the direction of a line L3 that connects the center of gravity GG6 of the cluster C6 to the center of gravity GG7 of the cluster C7 between the clusters C6 and C7, which are two clusters associated with each other. Accordingly, a cluster C8 in which the clusters C6 and C7 are associated with each other as one structure is generated.

On the other hand, when two or more contour lines in contours of one cluster match those of another cluster as shown in FIG. 8, a point group is interpolated between two contour lines that are opposed to each other (in this example, between the contour line q2 and the contour line q3) among contour lines that match each other between the clusters C9 and C10, which are two clusters associated with each other. Accordingly, a cluster C11 in which the clusters C9 and C10 are associated with each other as one structure is generated.

Modified Example 1

Another example of the method of generating the first projection cluster and the second projection cluster in Step S101 in FIG. 4 will be described.

Figure 9:
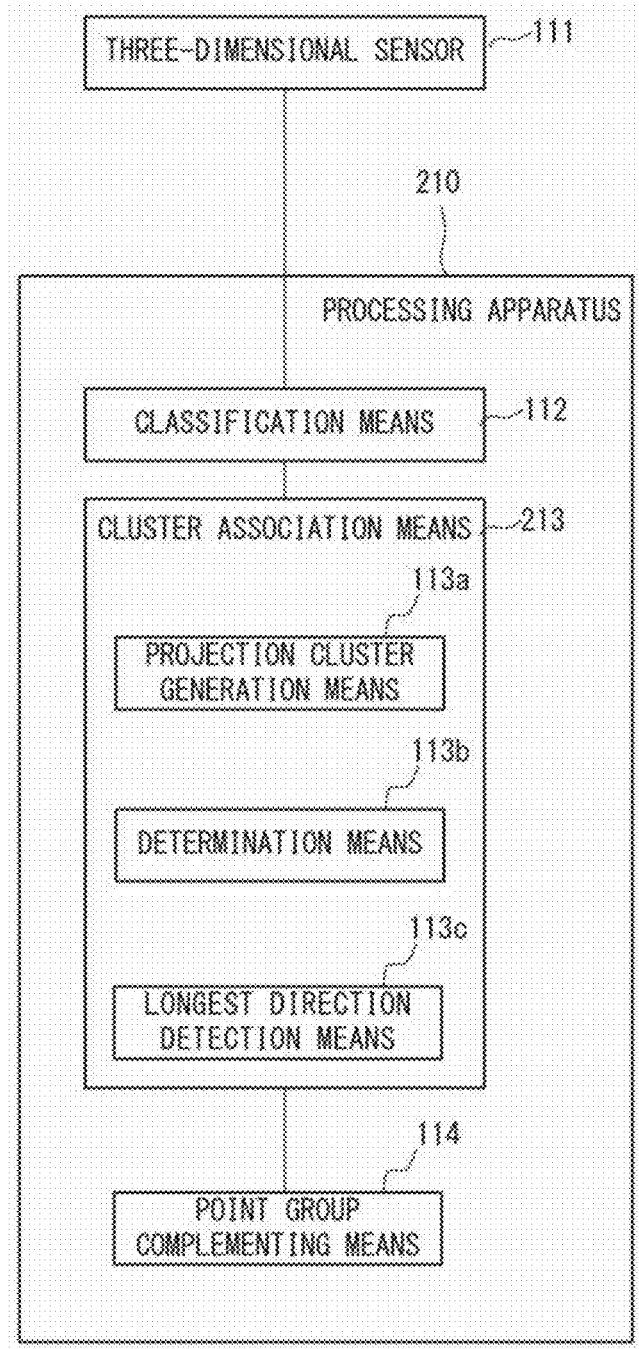
FIG. 9 is a block diagram showing a configuration of a processing apparatus for implementing a method of generating a first projection cluster and a second projection cluster according to Modified Example 1.

FIG. 9 is a block diagram showing a configuration of a processing apparatus 210 for implementing a method of generating a first projection cluster and a second projection cluster according to Modified Example 1. As shown in FIG. 9, cluster association means 213 of the processing apparatus 210 includes, besides the components included in the cluster association means 113 of the processing apparatus 110 shown in FIG. 2, longest direction detection means 113c. The longest direction detection means 113c detects, for each of all the clusters classified by the classification means, the longest direction in which the largest number of points are aligned.

A principal component analysis (PCA) method can be applied as a method of detecting the longest direction from a cluster. In the method of principal component analysis, the eigenvalue of a principal component (eigenvector) is a variance. In the method of principal component analysis, the principal components are called, in a descending order of eigenvalue, a first principal component, a second principal component, . . . . Since a cluster is composed of three parameters (x, y, z), three principal components, i.e., a first principal component, a second principal component, and a third principal component, can be obtained.

As described above, the longest direction is the direction in which the largest number of points are aligned in a cluster. In the method of principal component analysis, the eigenvalue of the principal component, which corresponds to the variance of points, becomes a maximum in the longest direction, which is the direction in which the largest number of points are aligned in a cluster. That is, the first principal component in which the eigenvalue of the principal component becomes a maximum is the longest direction. Therefore, by detecting the first principal component by the method of principal component analysis, the longest direction can be detected. Note that the shortest direction, which is the direction in which the lowest number of points are aligned in a cluster, is a third principal component in which the eigenvalue of the principal component becomes a minimum. It is assumed here that the situation in which the lowest number of points are aligned in the cluster does not include a case in which the number of points is zero.

Figure 10:
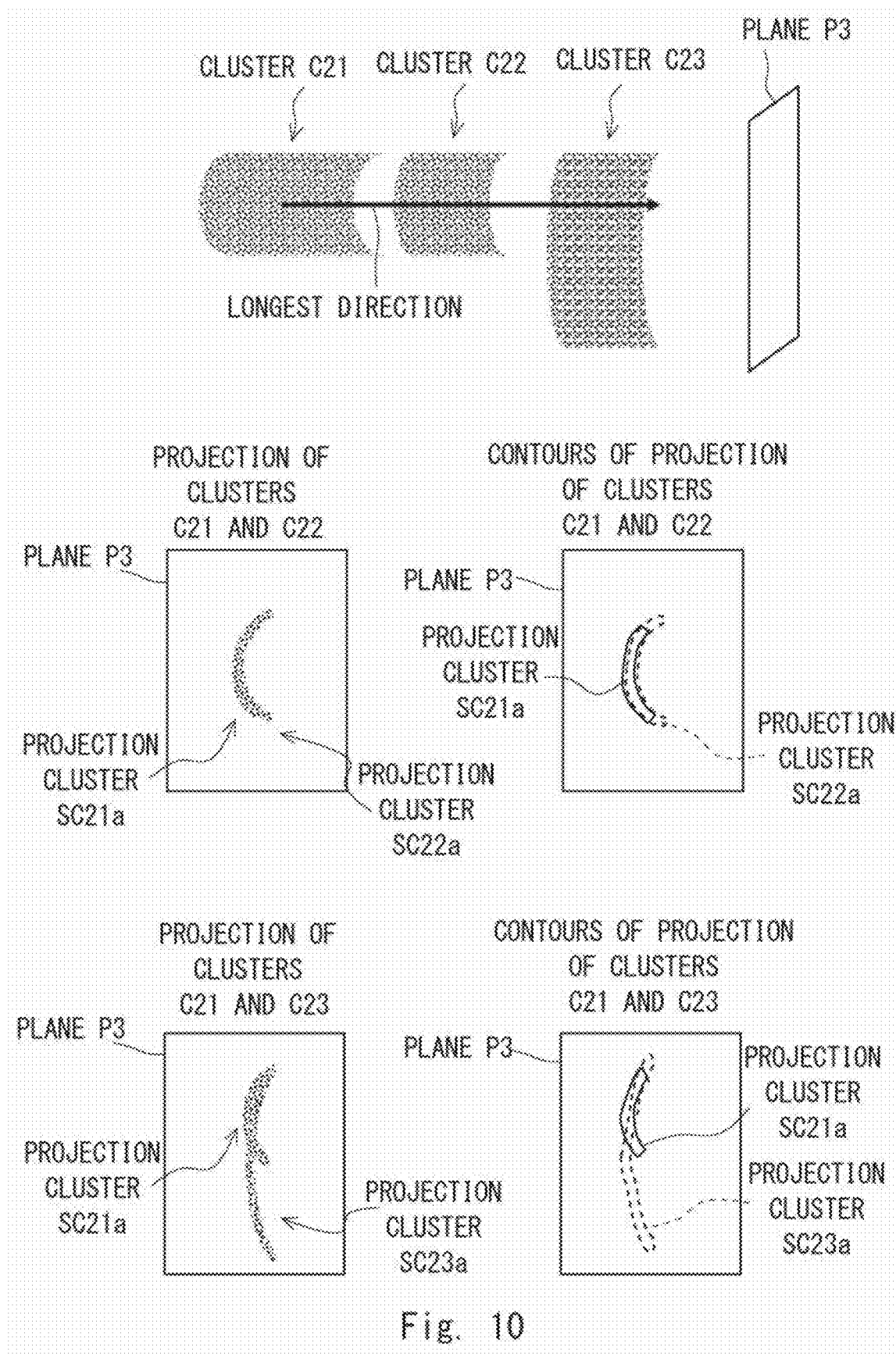
FIG. 10 is a schematic view for describing another example of the method of generating the first projection cluster and the second projection cluster in Step S101 in FIG. 4.

FIG. 10 is a schematic view for describing another example of the method of generating the first projection cluster and the second projection cluster in Step S101 in FIG. 4. In the example described here, the first plane is a plane vertical to the longest direction of the first cluster.

First, a case in which a cluster C21 is the first cluster and a cluster C22 is the second cluster will be described. As shown in the upper stage of FIG. 10, the first plane is a plane P3 that is vertical to the longest direction of the cluster C21. As shown in the middle stage of FIG. 10, by projecting the cluster C21 onto the plane P3, a projection cluster SC21a that corresponds to the first cluster is generated. Likewise, as shown in the middle stage of FIG. 5, by projecting the cluster C22 onto the plane P3, a projection cluster SC22a that corresponds to the second cluster is generated. In the middle stage of FIG. 10, the left side shows the projection of the clusters C21 and C22 onto the plane P3 and the right side shows contours of the projection of the clusters C21 and C22 onto the plane P3.

Since it is seen from the middle stage of FIG. 10 that the projection clusters SC21a and SC22a have a high degree of match, it is determined in Step S102 in FIG. 4 that the projection cluster SC21a matches the projection cluster SC22a. Therefore, the clusters C21 and C22 are associated with each other as one structure (see the processing of Step S103 in FIG. 4).

Next, a case in which the cluster C21 is the first cluster and a cluster C23 is the second cluster will be described. As shown in the upper stage of FIG. 10, the first plane is a plane P3 vertical to the longest direction of the cluster C21. As shown in the lower stage of FIG. 10, the cluster C21 is projected onto the plane P3, whereby a projection cluster SC21a that corresponds to the first cluster is generated. Likewise, as shown in the lower stage of FIG. 10, the cluster C22 is projected onto the plane P3, whereby a projection cluster SC23a that corresponds to the second cluster is generated. In the lower stage of FIG. 10, the left side shows the projection of the clusters C21 and C23 onto the plane P3 and the right side shows contours of the projection of the clusters C21 and C23 onto the plane P3.

Since it is seen from the lower stage of FIG. 10 that the projection cluster SC21a and the projection cluster SC23a have a low degree of match, it is determined in Step S102 in FIG. 4 that the projection cluster SC21a matches the projection cluster SC23a. Therefore, the clusters C21 and C23 are not associated with each other as one structure (see the processing of Step S104 in FIG. 4). Note that the determination regarding whether the degree of match is high or low is performed according to the aforementioned method.

Modified Example 2

Next, another example of processing of not associating the first cluster with the second cluster even when it is determined in Step S102 in FIG. 4 that the first projection cluster matches the second projection cluster will be described.

Figure 11:
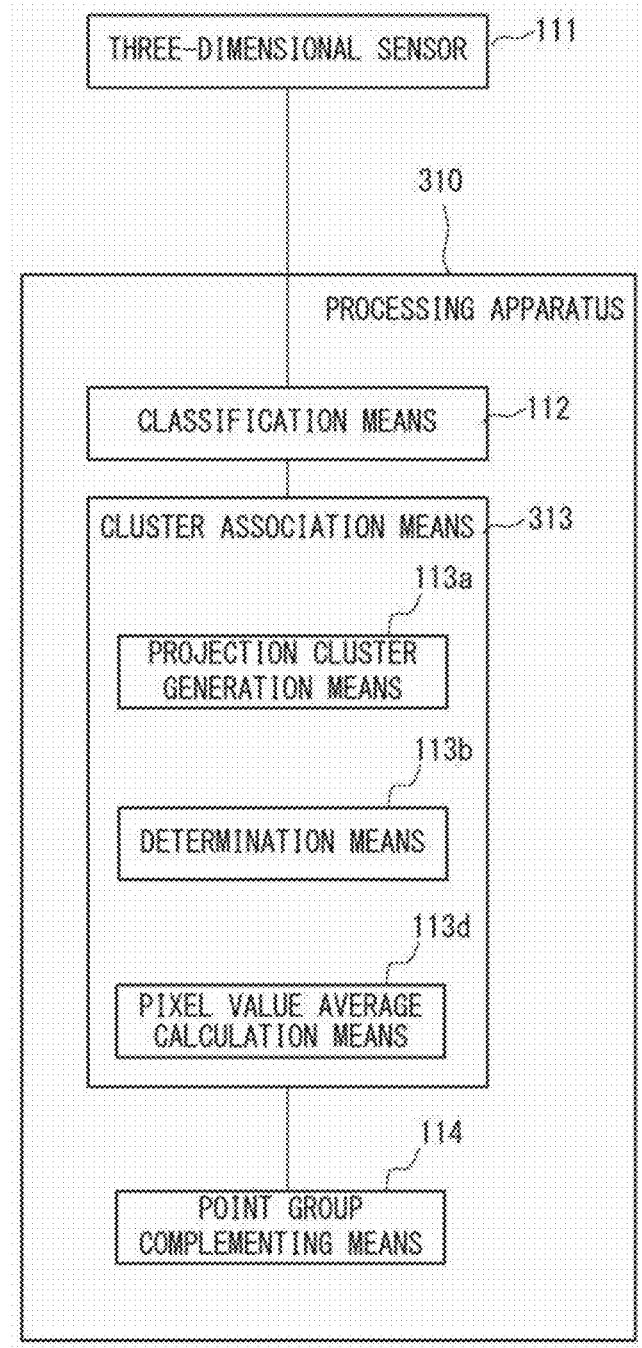
FIG. 11 is a block diagram showing a configuration of a processing apparatus for implementing processing of not associating the first cluster with the second cluster even when it is determined that the first projection cluster and the second projection cluster match each other according to Modified Example 2.

FIG. 11 is a block diagram showing a configuration of a processing apparatus 310 for implementing the processing of not associating the first cluster with the second cluster even when it is determined that the first projection cluster and the second projection cluster match each other according to Modified Example 2. As shown in FIG. 11, cluster association means 313 of the processing apparatus 310 further includes, besides the components included in the cluster association means 113 of the processing apparatus 110 shown in FIG. 2, pixel value average calculation means 113d. The pixel value average calculation means 113d generates a distance image from point group data and calculates the average of pixel values of pixels included in a region between the first cluster and the second cluster in the distance image that has been generated.

Figure 12:
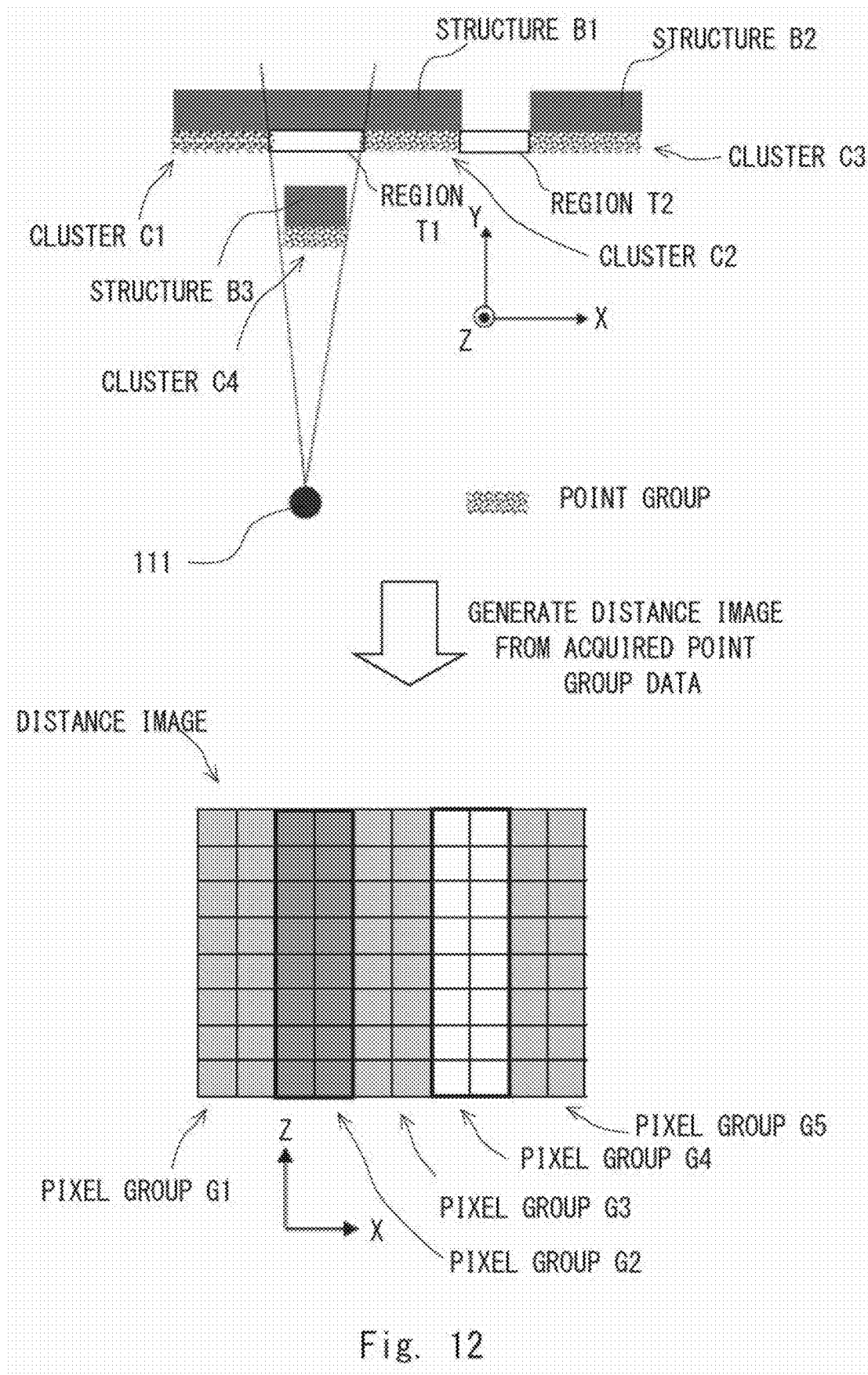
FIG. 12 is a schematic view for describing another example of the processing of not associating the first cluster with the second cluster even when it is determined in Step S102 in FIG. 4 that the first projection cluster matches the second projection cluster.

FIG. 12 is a schematic view for describing another example of processing of not associating the first cluster with the second cluster even when it is determined in Step S102 in FIG. 4 that the first projection cluster matches the second projection cluster. It is assumed that a projection cluster of a cluster C1 matches a projection cluster of a cluster C2. It is further assumed that the projection cluster of the cluster C2 matches a projection cluster of a cluster C3.

As shown in FIG. 12, the clusters C1 and C2 are both point groups acquired from a structure B1, the cluster C3 is a point group acquired from a structure B2, and a cluster C4 is a point group acquired from a structure B3. Since the clusters C1 and C2 are the same structure, they need to be associated with each other as one structure. On the other hand, since the clusters C2 and C3 are structures different from each other, they should not be associated with each other as one structure.

The distance image generated from the point group data acquired by the three-dimensional sensor 111 is a two-dimensional image that faces the three-dimensional sensor 111. In this example, the distance image extends in the X-Z plane. A pixel group G1 is a pixel group obtained from the cluster C1, a pixel group G2 is a pixel group obtained from the cluster C4, a pixel group G3 is a pixel group obtained from the cluster C2, and a pixel group G5 is a pixel group obtained from the cluster C3. The larger the distance between the structure which is located in a position that corresponds to a pixel and the three-dimensional sensor 111, the larger the pixel value in the pixel is. The averages of the pixel values in the pixel groups G1, G3, and G5 are substantially the same since the distance between the structure which is located in the position that corresponds to the pixel group and the three-dimensional sensor 111 is substantially the same in the pixel groups G1, G3, and G5. On the other hand, the distance between the structure which is located in a position that corresponds to the pixel group and the three-dimensional sensor 111 in the pixel group G2 is closer than those in the pixel groups G1, G3, and G5. Therefore, the average of the pixel values in the pixel group G2 is smaller than those in the pixel groups G1, G3, and G5.

When there is no structure that faces the three-dimensional sensor 111 in a position that corresponds to a pixel, the pixel value becomes a maximum. The pixel value of a pixel group G4 is a maximum since there is no structure that faces the three-dimensional sensor 111 in the position that corresponds to the pixel group G4. That is, the average of the pixel values in the pixel value G4 is greatly larger than those in the pixel group G1 and the pixel values G3 and G5. Even when there is a structure in the position that corresponds to the pixel value G4, if the distance between the structure and the three-dimensional sensor 111 in the pixel value G4 is longer than those in the pixel groups G1, G3, and G5, the average of the pixel values in the pixel value G4 becomes larger than those in the pixel group G1 and the pixel values G3 and G5.

When the average of the pixel values in the pixel group that corresponds to the position between the first cluster and the second cluster in the distance image is larger than a predetermined threshold, the determination means 113b does not associate the first cluster with the second cluster. The predetermined threshold is, for example, one of the average of the pixel values of the first cluster and the average of the pixel values of the second cluster which is larger than the other one. If the distance between the structure that corresponds to the first cluster and the three-dimensional sensor 111 is substantially the same as the distance between the structure that corresponds to the second cluster and the three-dimensional sensor 111, the threshold may be the average of pixel values of the pixel group in the position that corresponds to the first cluster. Whether the structure between the first cluster and the second cluster is in front with respect to the three-dimensional sensor 111 can be determined by comparing the average of the pixel values in the pixel group in the position that corresponds to a part between the first cluster and the second cluster and the average of the pixel values in the pixel group in the position that corresponds to the first cluster.

In the example shown in FIG. 12, the average of the pixel values in the pixel group G2 is smaller than those in the pixel groups G1 and G2. Therefore, a point group is complemented in the region T1. On the other hand, the average of the pixel values in the pixel group G4 is larger than those in the pixel groups G1 and G2. Therefore, a point group is not complemented in the region T2.

Modified Example 3

Another example of the processing of the subroutine in Step S2 in FIG. 3 will be described.

Figure 13:
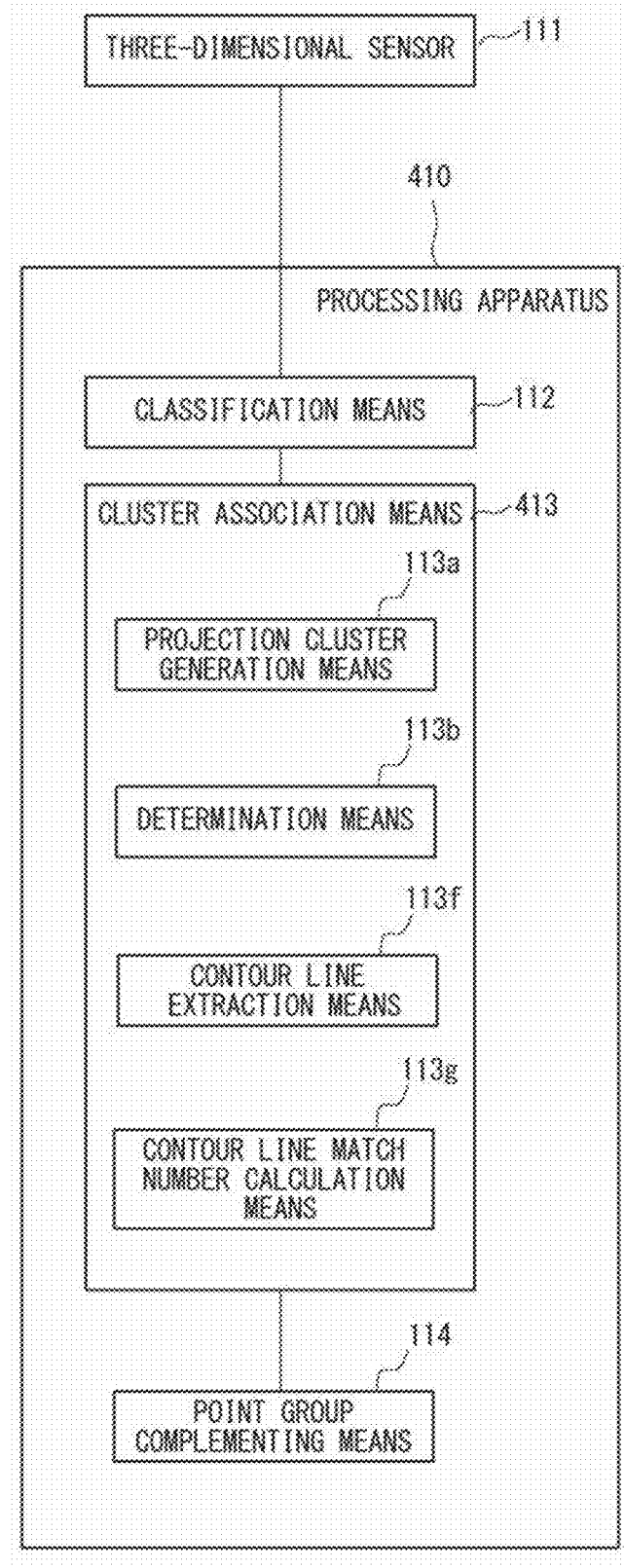
FIG. 13 is a block diagram showing a configuration of a processing apparatus for implementing the processing of subroutine in Step S2 in FIG. 3 according to Modified Example 3.

FIG. 13 is a block diagram showing a configuration of a processing apparatus 410 for implementing processing of the subroutine in Step S2 in FIG. 3 according to Modified Example 3. As shown in FIG. 13, cluster association means 413 of the processing apparatus 410 includes, besides the components included in the cluster association means 113 of the processing apparatus 110 shown in FIG. 2, contour line extraction means 113*f* and contour line match number calculation means 113*g*. The contour line extraction means 113*f* extracts contour lines of a first cluster and a second cluster. The contour line match number calculation means 113*g* calculates the number of contour lines in the first cluster that match contour lines in the second cluster.

Figure 14:
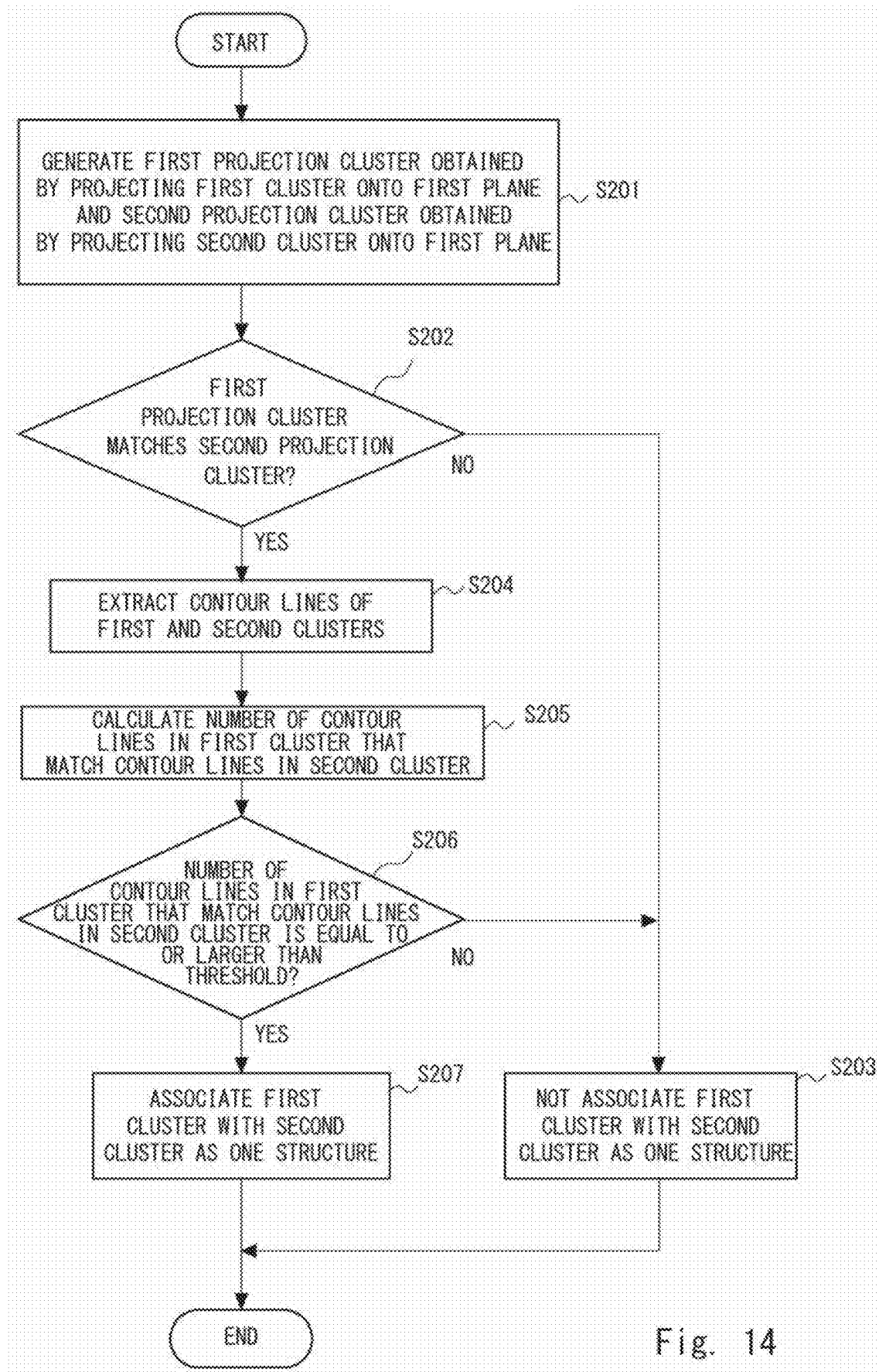
FIG. 14 is a flowchart showing a flow of processing of the subroutine in Step S2 in FIG. 3 according to Modified Example 3.

FIG. 14 is a flowchart showing a flow of processing of the subroutine in Step S2 in FIG. 3 according to Modified Example 3. As shown in FIG. 14, first, the projection cluster generation means 113*a* generates a first projection cluster obtained by projecting the first cluster onto a predetermined first plane and a second projection cluster obtained by projecting the second cluster onto the first plane (Step S201). Next, the determination means 113*b* determines whether the first projection cluster matches the second projection cluster (Step S202). When the first projection cluster does not match the second projection cluster in Step S202, the determination means 113*b* does not associate the first cluster with the second cluster as one structure (Step S203).

When the first projection cluster matches the second projection cluster in Step S202, the contour line extraction means 113*f* extracts contour lines of the first and second clusters (Step S204). Next, the contour line match number calculation means 113*g* compares a first contour line group, which is a plurality of contour lines extracted from the first cluster, with a second contour line group, which is a plurality of contour lines extracted from the second cluster, and calculates the number of contour lines in the first contour line group that match contour lines in the second contour line group (Step S205).

After Step S205, the determination means 113*b* determines whether the number of contour lines in the first cluster that match contour lines in the second cluster is equal to or larger than a threshold (Step S206). When the number of contour lines in the first cluster that match contour lines in the second cluster is equal to or larger than the threshold in Step S206, the determination means 113*b* associates the first cluster with the second cluster as one structure (Step S207). When the number of contour lines in the first cluster that match contour lines in the second cluster is smaller than the threshold in Step S206, the processing proceeds to Step S203, and the determination means 113*b* does not associate the first cluster with the second cluster as one structure.

Figure 15:
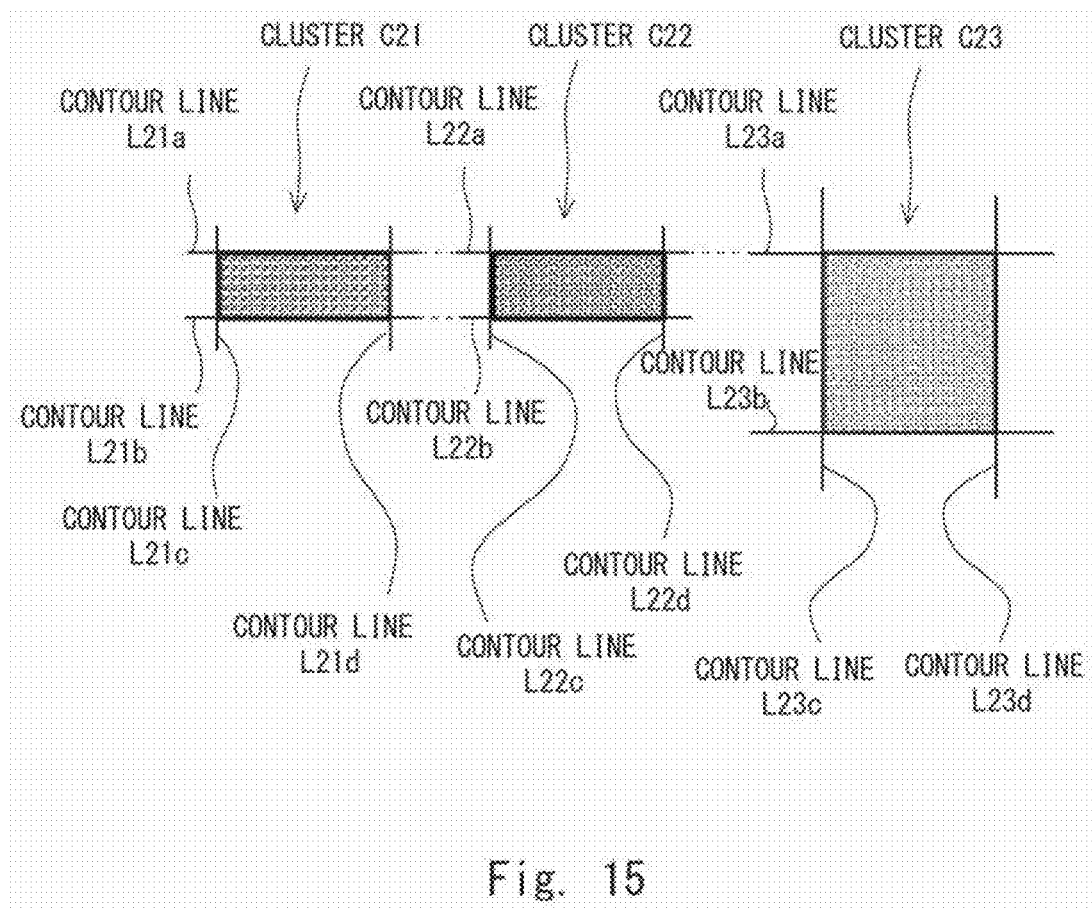
FIG. 15 is a schematic view for specifically describing determination regarding whether the number of contour lines in a first contour line group that match contour lines in a second contour line group is equal to or larger than a threshold in Step S206 in FIG. 14.

FIG. 15 is a schematic view for specifically describing the determination regarding whether the number of contour lines in the first contour line group that match contour lines in the second contour line group is equal to or larger than a threshold in Step S206 in FIG. 14. It is assumed here that the threshold of the number of contour lines that match each other is two.

As shown in FIG. 15, contour lines L21*a*, L21*b*, L21*c*, and L21*d* are extracted from a cluster C21, contour lines L22*a*, L22*b*, L22*c*, and L22*d* are extracted from a cluster C22, and contour lines L23*a*, L23*b*, L23*c*, and L23*d* are extracted from extracted from a cluster C23. That is, four contour lines are extracted from each of the clusters.

First, assume that the first cluster is the cluster C21 and the second cluster is the cluster C22. The first contour line group includes the contour lines L21*a*, L21*b*, L21*c*, and L21*d* extracted from the cluster C21, which is the first cluster. The second contour line group includes the contour lines L22*a*, L22*b*, L22*c*, and L22*d* extracted from the cluster C22, which is the second cluster. In the first contour line group and the second contour line group, the contour line L21*a* and the contour line L22*a* match each other and the contour line L21*b* and the contour line L22*b* match each other. That is, the number of contour lines in the first contour line group that match contour lines in the second contour line group is two, which is equal to or larger than the threshold. Therefore, the clusters C21 and C22 are associated with each other as one structure.

Next, assume that the first cluster is the cluster C21 and the second cluster is the cluster C23. The first contour line group includes the contour lines L21*a*, L21*b*, L21*c*, and L21*d* extracted from the cluster C21, which is the first cluster. The second contour line group includes the contour lines L23*a*, L23*b*, L23*c*, and L23*d* extracted from the cluster C23, which is the second cluster. In the first contour line group and the second contour line group, only the contour line L21*a* and the contour line L23*a* match each other. That is, the number of contour lines in the first contour line group that match contour lines in the second contour line group is one, which is smaller than the threshold. Therefore, the clusters C21 and C23 are not associated with each other as one structure.

Figure 16:
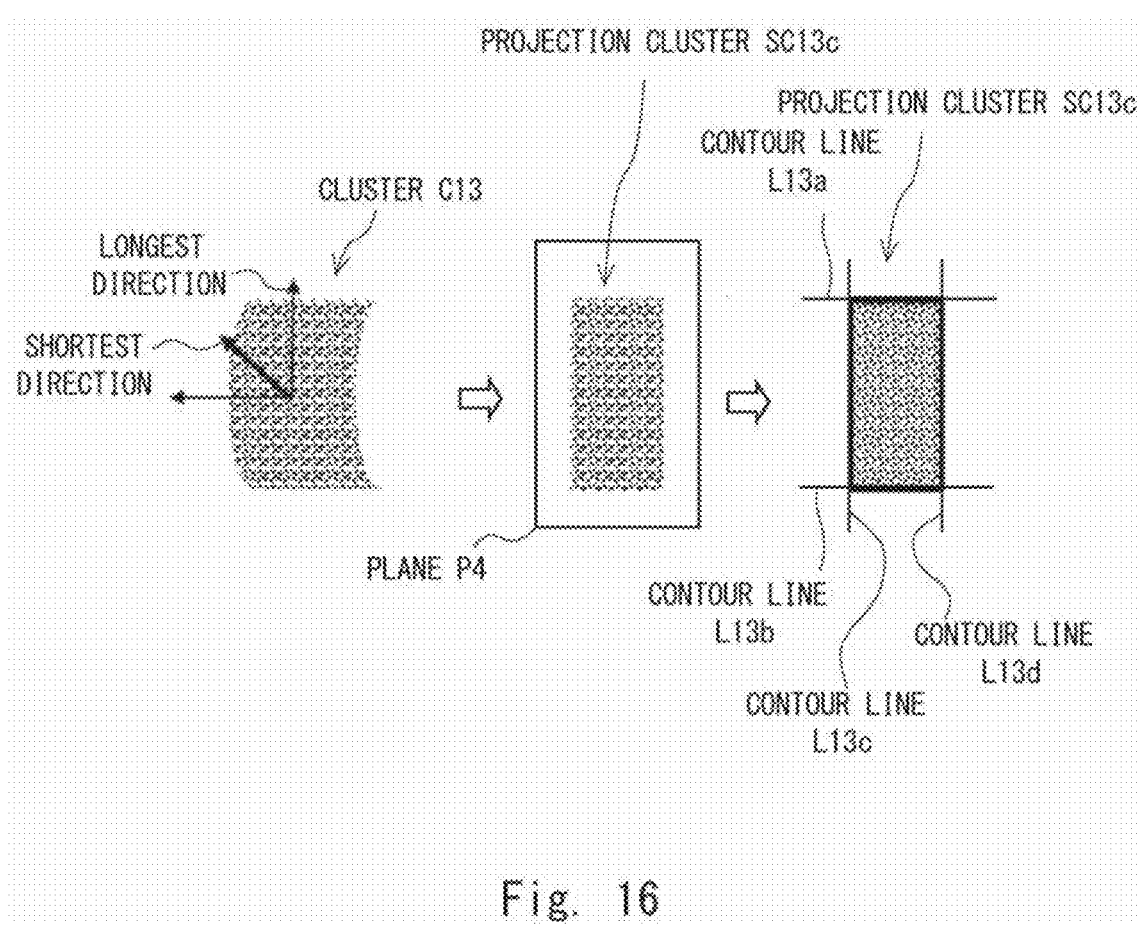
FIG. 16 is a schematic view for describing one example of a method of extracting contour lines from a cluster having a curved part in its contours.

FIG. 16 is a schematic view for describing one example of a method of extracting contour lines from a cluster having a curved part in its contours. As shown in FIG. 16, first, the shortest direction of a cluster C13 having a curved part in its contours is detected. The shortest direction of the cluster C13 is detected, for example, by the aforementioned method of principal component analysis. Next, the cluster C13 is projected onto a plane P4 vertical to the shortest direction. Next, contour lines (L13*a*, L13*b*, L13*c*, L13*d*) are extracted from a projection cluster SC13*c* obtained by projecting the cluster C13 onto the plane P4.

Modified Example 4

Another example of the processing of the subroutine in Step S2 in FIG. 3 will be described.

Figure 17:
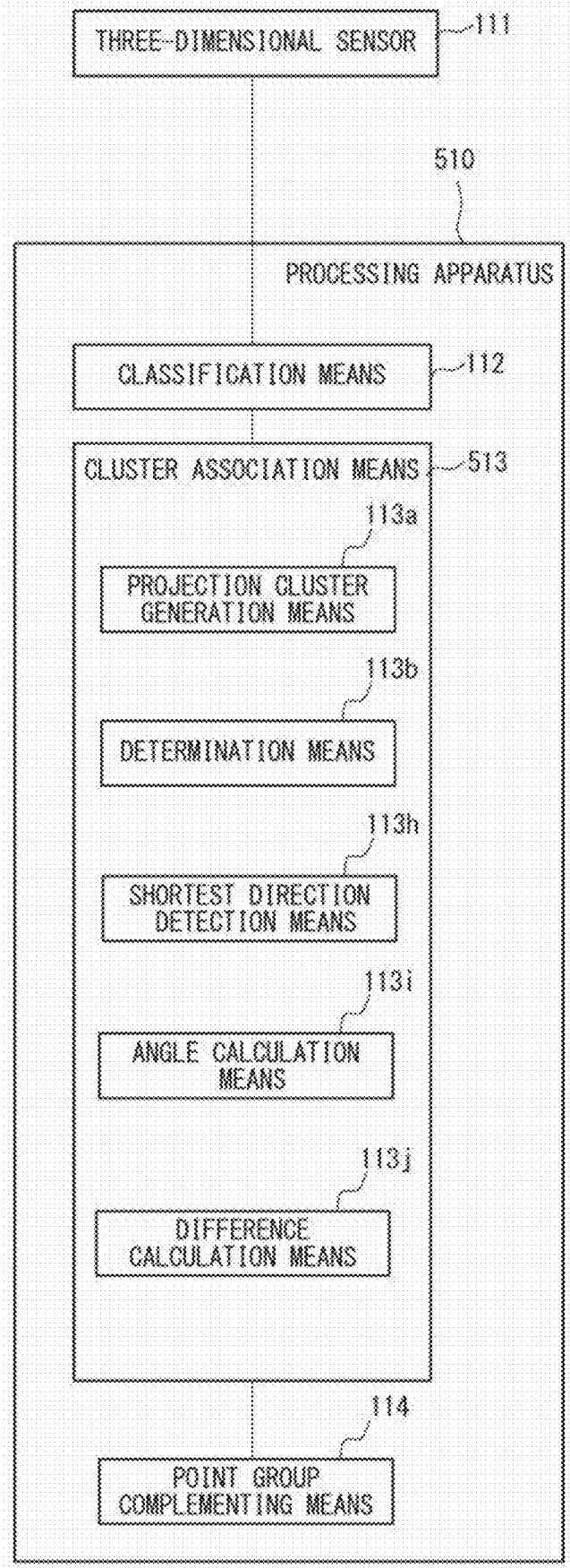
FIG. 17 is a block diagram showing a configuration of a processing apparatus for implementing the processing of subroutine in Step S2 in FIG. 3 according to Modified Example 4.

FIG. 17 is a block diagram showing a configuration of a processing apparatus 510 for implementing the processing of the subroutine in Step S2 in FIG. 3 according to Modified Example 4. As shown in FIG. 17, cluster association means 513 of the processing apparatus 510 includes, besides the components included in the cluster association means 113 of the processing apparatus 110 shown in FIG. 2, shortest direction detection means 113*h*, angle calculation means 113*i*, and difference calculation means 113*j*.

The shortest direction detection means 113*h* detects, for each of all the clusters classified by the classification means, the shortest direction in which the least number of points are aligned. The shortest direction of the cluster C13 is detected, for example, by the aforementioned method of principal component analysis. The angle calculation means 113*i* calculates one of angles between the shortest direction detected by the first cluster and the shortest direction detected by the second cluster that is smaller than the other one. The difference calculation means 113*j* calculates the difference between a first average distance and a second average distance. The second plane is a plane vertical to the shortest direction detected by the first cluster. The first average distance is the average of the distances between the respective points included in a first cluster and a second plane. The second average distance is the average of the distances between the respective points included in a second cluster and the second plane.

Figure 18:
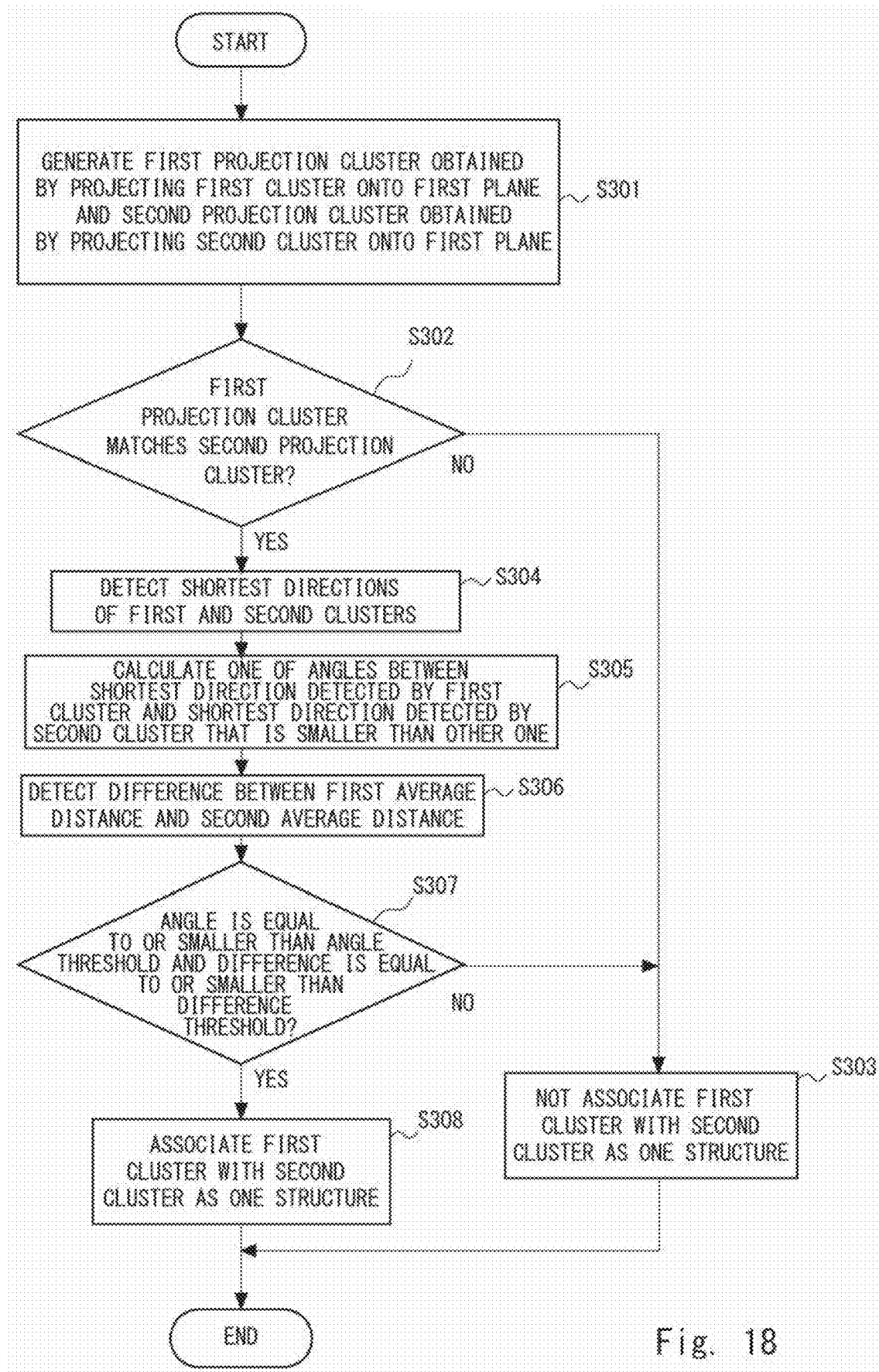
FIG. 18 is a flowchart showing a flow of processing of the subroutine in Step S2 in FIG. 3 according to the Modified Example 4.

FIG. 18 is a flowchart showing the flow of processing of the subroutine in Step S2 in FIG. 3 according to Modified Example 4. As shown in FIG. 18, first, the projection cluster generation means 113*a* generates a first projection cluster obtained by projecting the first cluster onto a predetermined first plane and a second projection cluster obtained by projecting the second cluster onto the first plane (Step S301). Next, the determination means 113b determines whether the first projection cluster matches the second projection cluster (Step S302). When the first projection cluster does not match the second projection cluster in Step S302, the determination means 113b does not associate the first cluster with the second cluster as one structure (Step S303).

When the first projection cluster matches the second projection cluster in Step S302, the shortest direction detection means 113h detects, for each of all the clusters classified by the classification means, the shortest direction in which the least number of points are aligned (Step S304). Next, the angle calculation means 113i calculates one of the angles between the shortest direction detected by the first cluster and the shortest direction detected by the second cluster that is smaller than the other one (Step S305). Next, the difference calculation means 113j calculates the difference between a first average distance obtained by calculating the average of the distances between the respective points included in the first cluster and a second plane that is vertical to the shortest direction and a second average distance obtained by calculating the average of the distances between the respective points included in the second cluster and the second plane that is vertical to the shortest direction (Step S306).

After Step S306, the determination means 113b determines whether the angle is equal to or smaller than an angle threshold and the difference is equal to or smaller than a difference threshold (Step S307). When the angle is equal to or smaller than the angle threshold and the difference is equal to or smaller than the difference threshold in Step S307, the determination means 113b associates the first cluster with the second cluster as one structure (Step S308). When it is determined in Step S307 that the angle is larger than the angle threshold or the difference is larger than the difference threshold in Step S307, the processing proceeds to Step S303, and the determination means 113b does not associate the first cluster with the second cluster as one structure.

Figure 19:
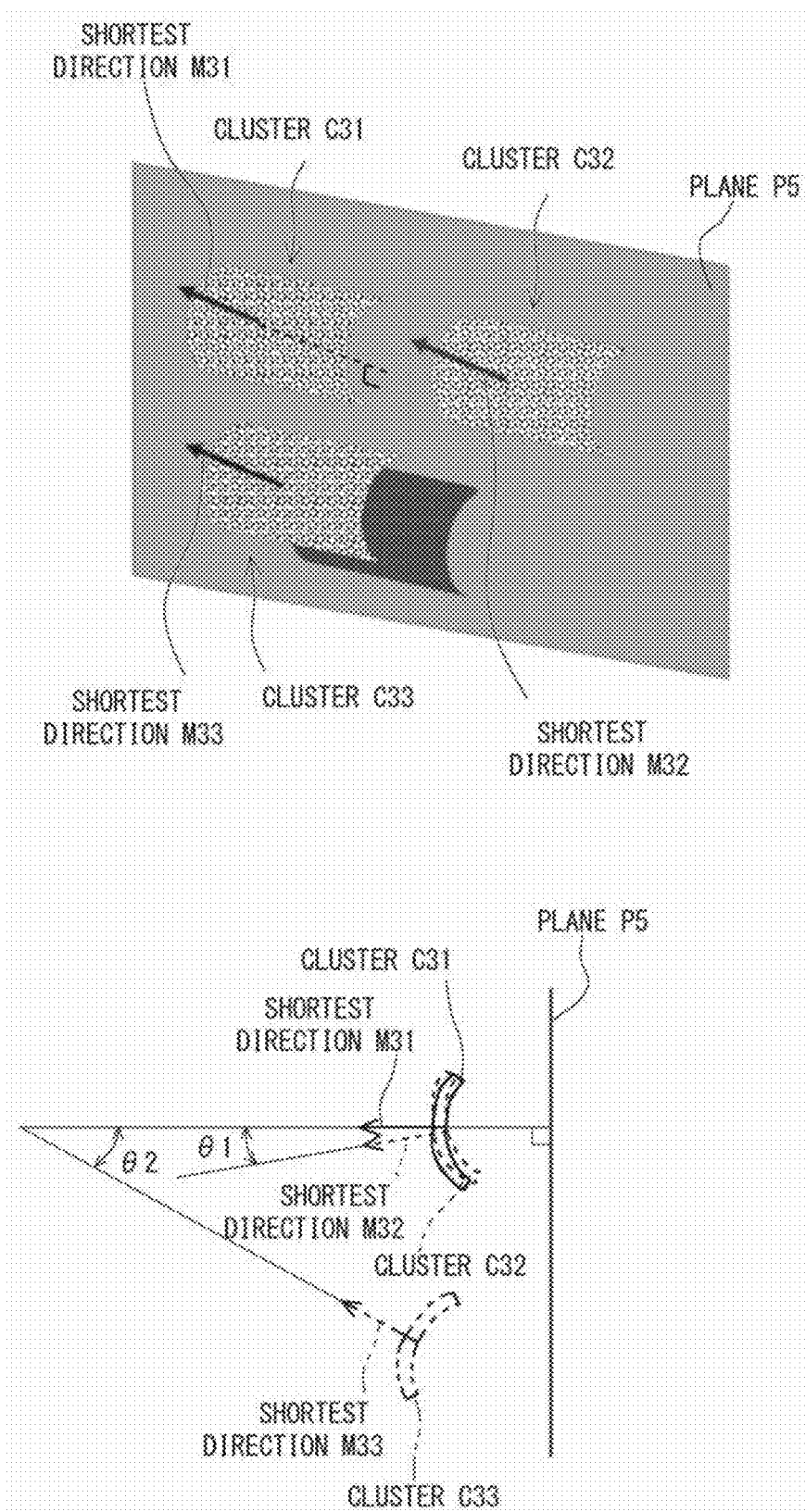
FIG. 19 is a schematic view for describing one of angles between the shortest direction detected by the first cluster and the shortest direction detected by the second cluster that is smaller than the other one, and a second plane.

FIG. 19 is a schematic view for describing one of the angles between the shortest direction detected by the first cluster and the shortest direction detected by the second cluster that is smaller than the other one, and a second plane. The shortest direction detected by a cluster C31 is denoted by a shortest direction M31, the shortest direction detected by a cluster C32 is denoted by a shortest direction M32, and the shortest direction detected by a cluster C33 is denoted by a shortest direction M33.

Assume that the first cluster is the cluster C31 and the second cluster is the cluster C32. As shown in FIG. 19, an angle θ1 is one of the angles between the shortest direction M31 and the shortest direction M32 that is smaller than the other one, that is, one of the angles between the shortest direction detected by the first cluster and the shortest direction detected by the second cluster that is smaller than the other one. The second plane is a plane P5 which is vertical to the shortest direction M31 detected by the cluster C31.

It is assumed that the angle θ1 between the cluster C31 and the cluster C32 is equal to or smaller than an angle threshold. In this case, the clusters C31 and C32 are associated with each other as one structure if the difference between the average of the distances between the respective points of the cluster C31 and the plane P5 and the average of the distances between the respective points of the cluster C32 and the plane P5 is equal to or smaller than the difference threshold.

Further, it is assumed, as shown in FIG. 19, that the first cluster is the cluster C31 and the second cluster is the cluster C33. An angle θ2 is one of the angles between the shortest direction M31 and the shortest direction M33 that is smaller than the other one, that is, one of the angles between the shortest direction detected by the first cluster and the shortest direction detected by the second cluster that is smaller than the other one. The second plane is a plane P5 vertical to the shortest direction M31 detected by the cluster C31.

Assume that the angle θ2 between the cluster C31 and the cluster C33 is larger than the angle threshold. In this case, the clusters C31 and C33 are not associated with each other as one structure without even calculating the difference between the average of the distances between the respective points of the cluster C31 and the plane P5 and the average of the distances between the respective points of the cluster C33 and the plane P5.

While the present invention has been described as a hardware configuration in the above example embodiments, the present invention is not limited thereto. The present invention can achieve each process by causing a Central Processing Unit (CPU) to execute a program.

The program for implementing the aforementioned processing can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, semiconductor memories (such as mask ROM, Programmable ROM (PROM), Erasable ROM (EPROM), flash ROM, and Random Access Memory (RAM)). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described above with reference to the example embodiments, the present invention is not limited to them. Various changes that may be understood by those skilled in the art can be made to the configurations and the details of the present invention within the scope of the invention. Further, the plurality of examples described above may be executed in combination with each other as appropriate.

REFERENCE SIGNS LIST 10, 110, 210, 310, 410, 510 Processing Apparatus
12, 112 Classification Means
13, 113, 213, 313, 413, 513 Cluster Association Means
111 Three-dimensional Sensor
113a Projection Cluster Generation Means
113b Determination Means
113c Longest Direction Detection
113d Pixel Value Average Calculation Means
113f Contour Line Extraction Means
113g Contour Line Match Number Calculation Means
113h Shortest Direction Detection Means
113i Angle Calculation Means
113j Difference Calculation Means
114 Point Group Complementing Means

What is claimed is:

1. A processing apparatus comprising:
at least one memory storing instructions, and
at least one processor configured to execute the instructions to:
classify three-dimensional point group data acquired based on a reflected light from a structure to be inspected illuminated by light into clusters, which are units of a shape that corresponds to the structure, based on positional information at each point of the data;
determine whether a first cluster and a second cluster included in the classified clusters correspond to one structure based on a positional relation between the classified clusters;
generate a first projection cluster obtained by projecting the first cluster onto a predetermined first plane and a second projection cluster obtained by projecting the second cluster onto the first plane, the first plane being vertical to a line that connects the center of gravity of the first cluster to the center of gravity of the second cluster; and
take into account a result of a determination regarding whether the first projection cluster matches the second projection cluster in the association between the first cluster and the second cluster.

2. The processing apparatus according to claim 1, wherein the at least one processor is further configured to execute the instructions to:
extract, for each of all the clusters classified, a plurality of contour lines that are present;
compare, for a first cluster and a second cluster included in all the clusters, a first contour line group, which is a plurality of contour lines extracted from the first cluster, with a second contour line group, which is a plurality of contour lines extracted from the second cluster, and calculating the number of contour lines in the first contour line group that match contour lines in the second contour line group; and
take into account the number of contour lines that match each other in the association between the first cluster and the second cluster.

3. A processing apparatus comprising:
at least one memory storing instructions, and
at least one processor configured to execute the instructions to;
classify three-dimensional point group data acquired based on a reflected light from a structure to be inspected illuminated by light into clusters, which are units of a shape that corresponds to the structure, based on positional information at each point of the data;
determine whether a first cluster and a second cluster included in the classified clusters correspond to one structure based on a positional relation between the classified clusters;
generate a first projection cluster obtained by projecting the first cluster onto a predetermined first plane and a second projection cluster obtained by projecting the second cluster onto the first plane;
detect, for each of all the clusters classified, the longest direction in which the largest number of points are aligned, the first plane is-being vertical to the longest direction; and
take into account a result of a determination regarding whether the first projection cluster matches the second projection cluster in the association between the first cluster and the second cluster.

4. A processing apparatus comprising:
at least one memory storing instructions, and
at least one processor configured to execute the instructions to;
classify three-dimensional point group data acquired based on a reflected light from a structure to be inspected illuminated by light into clusters, which are units of a shape that corresponds to the structure, based on positional information at each point of the data;
determine whether a first cluster and a second cluster included in the classified clusters correspond to one structure based on a positional relation between the classified clusters;
detect, for each of all the clusters classified, the shortest direction in which the least number of points being aligned;
calculate one of the angles between the shortest direction detected by the first cluster and the shortest direction detected by the second cluster that is smaller than the other one;
calculate the difference between a first average distance, which is the average of distances between respective points included in the first cluster and a second plane, and a second average distance, which is the average of distances between respective points included in the second cluster and the second plane, the second plane being a plane vertical to the shortest direction detected by the first cluster; and
take into account the angle and the difference in the association between the first cluster and the second cluster.

5. A processing apparatus comprising:
at least one memory storing instructions, and
at least one processor configured to execute the instructions to;
classify three-dimensional point group data acquired based on a reflected light from a structure to be inspected illuminated by light into clusters, which are units of a shape that corresponds to the structure, based on positional information at each point of the data;
determine whether a first cluster and a second cluster included in the classified clusters correspond to one structure based on a positional relation between the classified clusters; and
determine whether there is a third cluster including points whose number is equal to or larger than a predetermined number in a position in front of a structure to be inspected between the first cluster and the second cluster with respect to a three-dimensional sensor that irradiates light on the structure to be inspected, and dissociate the first cluster with the second cluster when there is no third cluster, and associate the first cluster with the second cluster when there is the third cluster.

6. The processing apparatus according to claim 5, wherein the at least one processor is further configured to execute the instructions to:
complement a point group between the first cluster and the second cluster when it has been determined that the first cluster will be associated with the second cluster.

7. A processing apparatus comprising:
at least one memory storing instructions, and
at least one processor configured to execute the instructions to;
classify three-dimensional point group data acquired based on a reflected light from a structure to be inspected illuminated by light into clusters, which are units of a shape that corresponds to the structure, based on positional information at each point of the data;

determine whether a first cluster and a second cluster included in the classified clusters correspond to one structure based on a positional relation between the classified clusters, generate a distance image from point group data and calculate the average of pixel values of pixels included in a region between the first cluster and the second cluster in the distance image that has been generated; and dissociate the first cluster with the second cluster when the average is larger than a predetermined threshold and associate the first cluster with the second cluster when the average is below the predetermined threshold.

8. A processing method comprising:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

generating a first projection cluster obtained by projecting the first cluster onto a predetermined first plane and a second projection cluster obtained by projecting the second cluster onto the first plane, the first plane being vertical to a line that connects the center of gravity of the first cluster to the center of gravity of the second cluster; and taking into account a result of a determination regarding whether the first projection cluster matches the second projection cluster in the association between the first cluster and the second cluster.

9. A non-transitory computer readable medium storing a program for causing a computer to execute:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

generating a first projection cluster obtained by projecting the first cluster onto a predetermined first plane and a second projection cluster obtained by projecting the second cluster onto the first plane, the first plane being vertical to a line that connects the center of gravity of the first cluster to the center of gravity of the second cluster; and taking into account a result of a determination regarding whether the first projection cluster matches the second projection cluster in the association between the first cluster and the second cluster.

10. A processing method comprising:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

generating a first projection cluster obtained by projecting the first cluster onto a predetermined first plane and a second projection cluster obtained by projecting the second cluster onto the first plane;

detecting, for each of all the clusters classified, the longest direction in which the largest number of points are aligned, the first plane being vertical to the longest direction; and taking into account a result of a determination regarding whether the first projection cluster matches the second projection cluster in the association between the first cluster and the second cluster.

11. A processing method comprising:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

detecting, for each of all the clusters classified, the shortest direction in which the least number of points being aligned;

calculating one of the angles between the shortest direction detected by the first cluster and the shortest direction detected by the second cluster that is smaller than the other one;

calculating the difference between a first average distance, which is the average of distances between respective points included in the first cluster and a second plane, and a second average distance, which is the average of distances between respective points included in the second cluster and the second plane, the second plane being a plane vertical to the shortest direction detected by the first cluster; and taking into account the angle and the difference in the association between the first cluster and the second cluster.

12. A processing method comprising:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters; and determining whether there is a third cluster including points whose number is equal to or larger than a predetermined number in a position in front of a structure to be inspected between the first cluster and the second cluster with respect to a three-dimensional sensor that irradiates light on the structure to be inspected, dissociating the first cluster with the second cluster when there is no third cluster, and associating the first cluster with the second cluster when there is the third cluster.

13. A processing method comprising:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

generating a distance image from point group data and calculating the average of pixel values of pixels included in a region between the first cluster and the second cluster in the distance image that has been generated; and dissociating the first cluster with the second cluster when the average is larger than a predetermined threshold and associating the first cluster with the second cluster when the average is below the predetermined threshold.

14. A non-transitory computer readable medium storing a program configured to cause a computer to execute:

classifying three-dimensional point group data acquired based on a reflected light from a structure to be inspected illuminated by light into clusters, which are units of a shape that corresponds to the structure, based on positional information at each point of the data; and determining whether a first cluster and a second cluster included in the classified clusters correspond to one structure based on a positional relation between the classified clusters;

generating a first projection cluster obtained by projecting the first cluster onto a predetermined first plane and a second projection cluster obtained by projecting the second cluster onto the first plane;

detecting, for each of all the clusters classified, the longest direction in which the largest number of points are aligned, the first plane being vertical to the longest direction; and taking into account a result of a determination regarding whether the first projection cluster matches the second projection cluster in the association between the first cluster and the second cluster.

15. A non-transitory computer readable medium storing a program configured to cause a computer to execute:

classifying three-dimensional point group data acquired based on a reflected light from a structure to be inspected illuminated by light into clusters, which are units of a shape that corresponds to the structure, based on positional information at each point of the data; and determining whether a first cluster and a second cluster included in the classified clusters correspond to one structure based on a positional relation between the classified clusters;

detecting, for each of all the clusters classified, the shortest direction in which the least number of points being aligned;

calculating one of the angles between the shortest direction detected by the first cluster and the shortest direction detected by the second cluster that is smaller than the other one;

calculating the difference between a first average distance, which is the average of distances between respective points included in the first cluster and a second plane, and a second average distance, which is the average of distances between respective points included in the second cluster and the second plane, the second plane being a plane vertical to the shortest direction detected by the first cluster; and taking into account the angle and the difference in the association between the first cluster and the second cluster.

16. A non-transitory computer readable medium storing a program configured to cause a computer to execute:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters; and determining whether there is a third cluster including points whose number is equal to or larger than a predetermined number in a position in front of a structure to be inspected between the first cluster and the second cluster with respect to a three-dimensional sensor that irradiates light on the structure to be inspected, dissociating the first cluster with the second cluster when there is no third cluster, and associating the first cluster with the second cluster when there is the third cluster.

17. A non-transitory computer readable medium storing a program configured to cause a computer to execute:

classifying three-dimensional point group data acquired based on a reflected light from a structure to be inspected illuminated by light into clusters, which are units of a shape that corresponds to the structure, based on positional information at each point of the data;

determining whether a first cluster and a second cluster included in the classified clusters correspond to one structure based on a positional relation between the classified clusters;

generating a distance image from point group data and calculating the average of pixel values of pixels included in a region between the first cluster and the second cluster in the distance image that has been generated; and dissociating the first cluster with the second cluster when the average is larger than a predetermined threshold and associating the first cluster with the second cluster when the average is below the predetermined threshold.

* * * * *